United States Patent
Jin et al.

(10) Patent No.: US 12,252,575 B2
(45) Date of Patent: Mar. 18, 2025

(54) SUPPORTED THREE-CENTER CATALYST AND PREPARATION METHOD AND APPLICATION

(71) Applicant: SOUTH CHINA AGRICULTURAL UNIVERSITY, Guangdong (CN)

(72) Inventors: Yulong Jin, Guangdong (CN); Boping Liu, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 667 days.

(21) Appl. No.: 17/434,892

(22) PCT Filed: May 9, 2020

(86) PCT No.: PCT/CN2020/089296
§ 371 (c)(1),
(2) Date: Aug. 30, 2021

(87) PCT Pub. No.: WO2020/224653
PCT Pub. Date: Nov. 12, 2020

(65) Prior Publication Data
US 2022/0056165 A1 Feb. 24, 2022

(30) Foreign Application Priority Data
May 9, 2019 (CN) .......................... 201910382436.4

(51) Int. Cl.
| | | |
|---|---|---|
| B01J 31/34 | (2006.01) | |
| B01J 31/36 | (2006.01) | |
| C08F 4/02 | (2006.01) | |
| C08F 4/68 | (2006.01) | |
| C08F 4/69 | (2006.01) | |
| C08F 110/02 | (2006.01) | |
| C08F 210/16 | (2006.01) | |

(52) U.S. Cl.
CPC ................. *C08F 4/69* (2013.01); *C08F 4/02* (2013.01); *C08F 4/68* (2013.01); *C08F 110/02* (2013.01); *C08F 210/16* (2013.01); *B01J 31/34* (2013.01); *B01J 31/36* (2013.01); *C08F 2410/01* (2013.01)

(58) Field of Classification Search
CPC .... B01J 23/648; B01J 23/652; B01J 23/6522; B01J 31/36; B01J 31/34; C08F 4/68; C08F 4/69
See application file for complete search history.

(56) References Cited

U.S. PATENT DOCUMENTS

| | | | |
|---|---|---|---|
| 3,331,827 A | 7/1967 | McCall et al. | |
| 4,285,834 A | 8/1981 | Lowery, Jr. et al. | |

FOREIGN PATENT DOCUMENTS

| | | | | |
|---|---|---|---|---|
| CN | 1209814 A | 3/1999 | | |
| CN | 103145897 A | 6/2013 | | |
| CN | 103626899 A | 3/2014 | | |
| CN | 105199021 A | 12/2015 | | |
| CN | 107011485 A | 8/2017 | | |
| CN | 107778387 A | 3/2018 | | |
| CN | 108203476 A | 6/2018 | | |
| CN | 110204636 A | 9/2019 | | |
| CN | 11552434 A | * 3/2021 | ............. | C08F 10/00 |
| EP | 0072075 A1 | 2/1983 | | |
| JP | S61275303 A | 12/1986 | | |
| WO | 2013155946 A1 | 10/2013 | | |
| WO | 2013155982 A1 | 10/2013 | | |
| WO | WO-2020193104 A1 | * 10/2020 | ............ | C08F 110/02 |

OTHER PUBLICATIONS

CN11552434 (Mar. 26, 2021); machine translation. (Year: 2021).*
International Search Report dated Aug. 13, 2020; International Appl No. PCT/CN2020/089296.

* cited by examiner

*Primary Examiner* — Rip A Lee
(74) *Attorney, Agent, or Firm* — Dinsmore & Shohl LLP

(57) ABSTRACT

A supported three-center catalyst, a preparation method and the use are provided. The catalyst comprises a porous inorganic carrier, an organic chromium active component, an inorganic chromium active component and an inorganic vanadium active component, and may further comprise a catalyst modifying component. A method involves, by means of one or more steps of dipping and drying or dipping, drying and high-temperature roasting procedures, respectively converting an organic chromium source, a chromium source, a vanadium source and a Q component into an organic chromium active component precursor, an inorganic chromium active component precursor, an inorganic vanadium active component precursor and a catalyst modifying component that are supported on the surface of the porous inorganic carrier, and then activating same with an organometallic cocatalyst or a polymerization monomer, so as to obtain the supported three-center catalyst.

19 Claims, 2 Drawing Sheets

SUPPORTED THREE-CENTER CATALYST AND PREPARATION METHOD AND APPLICATION

CROSS-REFERENCE TO RELATED APPLICATIONS

This application is the U.S. National Stage of PCT/CN2020/089296 filed May 9, 2020, which claims priority to Chinese Patent Application No. 201910382436.4, filed May 9, 2019, the content of both are incorporated herein by reference in their entirety.

FIELD OF THE INVENTION

The present invention belongs to the field of catalysts, and particularly relates to a supported three-center catalyst and a preparation method and application thereof.

BACKGROUND OF THE INVENTION

As a general-purpose plastic, polyethylene is widely used in various fields of industry, agriculture, vehicles, communication and daily life due to its excellent mechanical properties, electrical insulation, chemical corrosion resistance and low temperature resistance. These excellent properties mainly depend on polyethylene production technology, catalyst technology, post-processing technology, etc., in which the catalyst technology is the most critical technology, and thus has received extensive attention and research from industry and academia.

Currently, polyethylene catalysts widely used in industry mainly comprise the following three types: Ziegler-Natta titanium catalysts, chromium-based catalysts (mainly including an inorganic chromium Phillip catalyst and an organic chromium S-2 catalyst), and metallocene catalysts. On the basis of the above three types of catalysts, researchers have developed some novel catalysts, such as a composite two-center catalyst, which is implemented by making two catalysts blended or co-supported on a carrier. The starting point of their research is to enable this type of catalyst to have the characteristics of two active centers simultaneously, and even utilize the synergistic effect between the two active centers to show more excellent catalytic characteristics. However, in the actual research process, it has been found that this type of catalyst has higher development difficulty. The main reason is after compounding, the two active centers usually show the anti-synergistic effect, i.e., mutual poisoning weakens the catalytic performance. Through a large number of screenings, a series of supported chromium and vanadium bimetallic center polyethylene catalysts were developed in the early stage. Under most conditions, the bimetallic centers show the excellent catalytic synergistic effect, which significantly improves the catalyst polymerization activity, copolymerization performance, etc. of the catalyst on the basis of the original single-metal catalyst. The molecular weight of the synthetic polymer has a broad peak or bimodal distribution, and comonomers are also concentrated in high molecular weight components. Therefore, this series of catalysts have a huge advantage of synthesizing high-performance bimodal polyethylene by using a single-pot method, and may partially replace a two-pot series process for synthesizing high-performance bimodal polyethylene materials commonly used in industry, and the synthesis of high-performance bimodal polyethylene in a single reactor by using two-center catalytic technology requires lower device investment, lower operation difficulty and lower energy consumption.

On the other hand, in recent years, Lyondell Basell Industries in Germany and Mitsui Petrochemical Company in Japan have developed a three-stage process, which uses a single metal center catalyst by changing process conditions of three polymerization reactors, such as comonomer concentration and hydrogen partial pressure, to achieve the production of polyethylene with a trimodal molecular weight distribution (as shown in FIG. 1), and the polymers comprise an ethylene homopolymer A with a lower molecular weight, an ethylene copolymer B with a medium molecular weight, and an ethylene copolymer C with a high molecular weight or ultra-high molecular weight, in which the component A mainly provides the polymer with higher rigidity and processing performance, and the component B provides the polymer with good toughness and long-term mechanical properties. On this basis, the component C further improves the creep resistance and long-term mechanical properties of the polymer. The relative content of the components A, B, and C can be adjusted by the relative retention time of the catalyst in each reactor. Compared with the existing polyethylene on the market, the polyethylene synthesized by using this process with a trimodal molecular weight distribution has obvious advantages in the production of higher-grade pipes and films.

In the prior art, there is no report on the synthesis of high-performance trimodal polyethylene by using a single reactor via a three-center catalyst.

SUMMARY OF THE INVENTION

In order to overcome the above shortcomings of the prior art, the primary purpose of the present invention is to provide a supported three-center catalyst. The catalyst can be used for the homopolymerization of ethylene and the copolymerization of ethylene and α-olefin. The synthesized polymers have a wide molecular weight distribution, some of the polymers have a trimodal distribution, including low molecular weight ethylene homopolymer, medium molecular weight ethylene copolymer, and high molecular weight or ultra-high molecular weight ethylene copolymer.

Another object of the present invention is to provide a method for preparing the above supported three-center catalyst.

A further object of the present invention is to provide use of the above supported three-center catalyst in catalyzation of olefin polymerization.

The objects of the present invention are achieved through the following technical solutions:

A supported three-center catalyst comprises a porous inorganic carrier and three catalyst active centers, namely an organic chromium active component, an inorganic chromium active component, and an inorganic vanadium active component; or, in addition to the porous inorganic carrier, the organic chromium active component, the inorganic chromium active component, and the inorganic vanadium active component, the catalyst may further comprise a catalyst modification component.

The porous inorganic carrier is at least one of silicon oxide, aluminum oxide, aluminosilicate, inorganic clay, titanium oxide, zirconium oxide, magnesium oxide, calcium oxide, iron oxide, tin oxide, zinc oxide, boron oxide, tungsten oxide, and niobium oxide; the inorganic clay is preferably montmorillonite, and the silicon oxide is preferably amorphous porous silica gel. The porous inorganic carrier has a specific surface area of 50-800 m²/g, a pore volume of 0.1-5.0 cm³/g, and an average pore size of 1-50 nm;

the organic chromium active component is obtained after a precursor of the organic chromium active component is activated by an organometallic co-catalyst or a polymerization monomer, and the precursor of the organic chromium active component is obtained by loading an organic chromium source comprising at least one of a cyclopentadienyl ligand, an indenyl ligand, a fluorenyl ligand, a cyclopentadienyl derivative ligand, an indenyl derivative ligand, and a fluorenyl derivative ligand on the surface of the porous inorganic carrier;

the inorganic chromium active component is obtained by activating a precursor of the inorganic chromium active component by an organometallic co-catalyst or a polymerization monomer, and the precursor of the inorganic chromium active component is a high-temperature calcined product of a chromium source on the surface of a porous inorganic carrier;

the inorganic vanadium active component is obtained after a precursor of the inorganic vanadium active component is activated by an organometallic co-catalyst or a polymerization monomer, and the precursor of the inorganic vanadium catalyst is a high-temperature calcined product of the vanadium source on the surface of the porous inorganic carrier;

the catalyst modification component is a high-temperature calcined product of a compound comprising sulfur, phosphorus or halogen element on the surface of a porous inorganic carrier, wherein the compound comprising sulfur, phosphorus or halogen element is referred to as a component Q; and the polymerization monomer is ethylene or common α-olefins, and the common α-olefins comprise propylene, 1-butene, 1-hexene, etc.

The organometallic co-catalyst comprises any one of organoaluminum compounds, organolithium compounds, organoboron compounds, etc., which are commonly used as olefin polymerization co-catalysts or a combination thereof. The organoaluminum compounds may comprise trialkylaluminum $AlR_3$, dialkylaluminum alkoxide $AlR_2OR$, dialkylaluminum halide $AlR_2X$, aluminoxane, ethyl sesquialuminum chloride, etc., wherein R is an alkyl group, such as an alkyl group with 1-12 carbon atoms, such as methyl, ethyl, n-propyl, isopropyl, n-butyl, isobutyl, n-pentyl, n-hexyl, n-heptyl, n-octyl, n-nonyl, and n-dodecyl; and X is halogen, such as fluorine, chlorine, bromine and iodine, preferably chlorine. The aluminoxane may comprise all aluminum alkyl and water reactants such as aluminium methide. The organoaluminum compounds as the organometallic co-catalyst may be used alone or a combination of two or more organoaluminum compounds is used. As a specific example, the aluminum compound may be at least one of triethylaluminum, triisobutylaluminum, diethylaluminum ethoxide, diethylaluminum chloride, methylaluminoxane, etc.

The precursor of the organic chromium active component is obtained by loading the organic chromium source on the surface of the porous inorganic carrier. The simple structural formula of the organic chromium source may be expressed as follows: $CrCp^*_1Cp^*_2$, wherein $Cp^*_1$ and $Cp^*_2$ may be both cyclopentadienyl and derivatives thereof, indenyl and derivatives thereof, or fluorenyl and derivatives thereof, and whether $Cp^*_1$ and $Cp^*_2$ have the same structure is not limited.

Specifically, the structure of $Cp^*_1$ and $Cp^*_2$ may be one of the following structures:

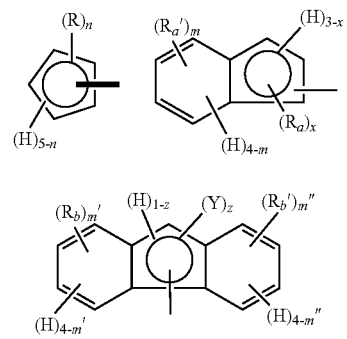

wherein R is a hydrocarbyl group with 1-20 carbon atoms; the hydrocarbyl group may be saturated or unsaturated, comprising aliphatic, alicyclic and aromatic, such as methyl, ethyl, propyl, butyl, pentyl, cyclopentane group, allyl group, phenyl group, naphthyl group, etc.; n is an integer from 0-5; a plurality of Rs connected to the aromatic ring are independent of each other, and may be the same or different;

Ra and Ra' are hydrocarbyl groups with 1-10 carbon atoms; the hydrocarbyl groups may be saturated or unsaturated, comprising aliphatic, alicyclic and aromatic, such as methyl, ethyl, propyl, butyl, pentyl, cyclopentyl, allyl, phenyl, naphthyl, etc.; m is an integer from 0-4; x is an integer from 0-3; a plurality of Ra and a plurality of Ra' connected to the aromatic ring are independent of each other, and may be the same or different;

Rb and Rb' are hydrocarbyl groups with 1 to 10 carbon atoms; the hydrocarbyl groups are saturated or unsaturated, comprising aliphatic, alicyclic and aromatic, such as methyl, ethyl, propyl, butyl, pentyl, cyclopentane, allyl, phenyl, naphthyl, or other functional groups; m' and m" are each an integer from 0-4; Y may be H, Rb or Rb'; z is 0 or 1; and a plurality of Rb and a plurality of Rb' connected to the aromatic ring are independent of each other, and may be the same or different.

The precursor of the inorganic chromium active component is a high-temperature calcined product of a chromium source (chromium-containing compound) on the surface of the inorganic carrier; the chromium source (chromium-containing compound) is selected from chromium trioxide, chromium nitrate, chromium acetate, chromium chloride, chromium sulfate, ammonium chromate, ammonium dichromate, chromium acetate hydroxide, other suitable soluble chromium salts, and any combination thereof.

The precursor of the inorganic vanadium active component is a high-temperature calcined product of a vanadium source (vanadium-containing compound) on the surface of the inorganic carrier; the vanadium source (vanadium-containing compound) may be selected from the following: ammonium hexafluorovanadate, vanadium nitrate, vanadyl oxalate, ammonium metavanadate, vanadyl sulfate, vanadium (IV) oxide sulfate hydrate, vanadium (III) sulfate, vanadium oxytrichloride, sodium orthovanadate, sodium metavanadate, etc., as well as water-insoluble vanadium-containing salts, such as vanadyl acetylacetonate, vanadium triisopropoxy oxide, vanadium (V) tri-n-propoxide oxide, vanadium acetylacetonate, vanadium oxytriethoxide, vanadyl chloride, vanadium silicide, other suitable soluble vanadium salts, and any combination thereof.

The catalyst modification component is the high-temperature calcined product of the component Q on the surface of the inorganic carrier; the component Q may be selected from the following: sulfuric acid, persulfuric acid, pyrosulfuric acid, sulfurous acid, taurine, ammonium sulfate, ammonium sulfite, ammonium persulfate, titanium sulfate, zirconium sulfate, vanadium sulfate, iron sulfate, ferrous sulfate, ammonium ferrous sulfate, nickel sulfate, zinc sulfate, aluminum sulfate, tin sulfate, antimony sulfate, phosphoric acid, pyrophosphate, superphosphoric acid, phosphorous acid, secondary phosphoric acid, metaphosphoric acid, ammonium phosphate, ammonium pyrophosphate, ammonium superphosphate, ammonium phosphite, ammonium hypophosphite, ammonium metaphosphate, titanium phosphate, zirconium phosphate, iron phosphate, nickel phosphate, zinc phosphate, aluminum phosphate, tin phosphate, antimony phosphate, hydrofluoric acid, ammonium fluoride, fluorosilicic acid, fluoroboric acid, ammonium fluoroborate, ammonium bifluoride, ammonium hexafluorosilicate, boron trifluoride, aluminum fluoride, antimony fluoride, ammonium hexafluorophosphate, ammonium hexafluorotitanate, hydrochloric acid, chlorosulfonic acid, ammonium chloride, ferrous chloride, ferric chloride, aluminum chloride, titanium tetrachloride, hydrobromic acid, ammonium bromide, iron bromide, ferrous bromide or aluminum bromide, and any combination thereof.

The structure of the active center precursor of the supported three-center catalyst is shown below, wherein the structure a is the precursor of the inorganic chromium active component, the structure b is the precursor of the inorganic vanadium active component, and the component c is the precursor of the organic chromium active component (wherein L is one of cyclopentadienyl and a derivative thereof, indenyl and a derivative thereof, fluorenyl and a derivative thereof):

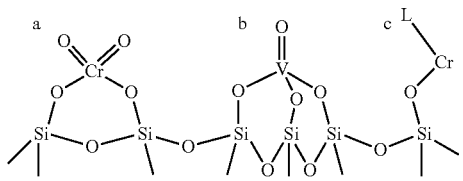

in the supported three-center catalyst, the content of Cr in the organic chromium active component is 0.1-12 wt % of the total weight of the catalyst (based on the weight of Cr); the content of Cr in the inorganic chromium active component is 0.05-12 wt % of the total weight of the catalyst (based on the weight of Cr); the content of V in the inorganic vanadium active component is 0.05-10 wt % of the total weight of the catalyst (based on the weight of V); and the content of sulfur, phosphorus and halogen elements in the catalyst modification component is 0.1-20 wt % of the total weight of the catalyst (based on the total weight of sulfur, phosphorus and halogen elements).

A method for preparing the above supported three-center catalyst comprises the preparation of a precursor of the supported three-center catalyst and the activation of the precursor of the supported three-center catalyst. When the supported three-center catalyst comprises a porous inorganic carrier, an organic chromium active component, an inorganic chromium active component, an inorganic vanadium active component, and a catalyst modification component, the preparation of the precursor of the supported three-center catalyst comprises the following steps:

(I) via procedures of impregnation, drying and high-temperature calcination, converting a chromium source, a vanadium source and a component Q into the precursor of the inorganic chromium active component, the precursor of the inorganic vanadium active component, and the catalyst modification component that are supported on the surface of the porous inorganic carrier, respectively, to obtain the precursor of the supported two-center catalyst, wherein the precursor of the inorganic chromium active component, the precursor of the inorganic vanadium active component, and the catalyst modification component are supported in an arbitrary order;

(II) via procedures of impregnation and drying, converting the organic chromium source into the precursor of the organic chromium active component supported on the surface of the supported two-center catalyst in step (1) to obtain the precursor of the supported three-center catalyst;

when the supported three-center catalyst comprises the porous inorganic carrier, the organic chromium active component, the inorganic chromium active component, and the inorganic vanadium active component, the preparation of the precursor of the supported three-center catalyst comprises the following steps:

(2.1) via procedures of impregnation, drying and high-temperature calcination, converting the chromium source and the vanadium source into the precursor of the inorganic chromium active component and the precursor of the inorganic vanadium active component that are supported on the surface of the porous inorganic carrier, respectively, to obtain the precursor of the supported two-center catalyst, wherein the precursor of the inorganic chromium active component and the precursor of the inorganic vanadium active component are supported in an arbitrary order;

(2.2) via procedures of impregnation and drying, converting the chromium source of the organic chromium catalyst into the precursor of the organic chromium active component supported on the surface of the precursor of the supported two-center catalyst in step (1) to obtain the precursor of the supported three-center catalyst; and the activation of the precursor of the supported three-center catalyst comprises the following steps: taking the precursor of the supported three-center catalyst prepared by using any of the above two methods, adding an organometallic co-catalyst for pre-treatment and activation, and then drying to obtain a target catalyst; or taking the above precursor of the supported three-center catalyst, and placing the precursor in a reactor before polymerization to react with the organometallic co-catalyst to form a target catalyst in situ; or taking the above precursor of the supported three-center catalyst and placing the precursor in high-pressure polymerization monomers, and forming a target catalyst through in-situ activation by the polymerization monomers.

In the above two methods for preparing the precursor of the three-center catalyst, the supporting order is arbitrary, which means that these active component precursors may be supported in any order. For example, in step (1.1), the chromium source, the vanadium source and the component Q can be simultaneously supported on the surface of the porous inorganic carrier by using a co-impregnation method, and then a precursor of the supported two-center catalyst is obtained through drying and high-temperature calcination;

or any two of the chromium source, the vanadium source and the component Q can be simultaneously supported on the surface of the porous inorganic carrier by using a co-impregnation method, then the porous inorganic carrier loaded with the corresponding active component precursor or modification component is obtained through drying and high-temperature calcination, and then the remaining component is converted into the corresponding active component precursor or modification component supported on the surface of the modified porous inorganic carrier via impregnation, drying and high-temperature calcination procedures; or any one of the chromium source, the vanadium source and the component Q can be converted into an active component precursor or modification component supported on the surface of the porous inorganic support, the remaining two components are supported on the modified porous inorganic carrier by using the co-impregnation method, and then the remaining two components are converted into the active component precursor supported on the surface of the porous inorganic carrier via drying and high-temperature calcination procedures, to obtain the target catalyst precursor; or the chromium source, the vanadium source and the component Q can be converted into the precursor of the inorganic chromium active component, the precursor of the inorganic vanadium active component and the catalyst modification component supported on the surface of the porous inorganic carrier, respectively, via impregnation, drying and high-temperature calcination procedures, to obtain the target catalyst precursor.

In step (1.1) and step (2.1), the chromium source, the vanadium source and the component Q enter porous inorganic carrier pores through impregnation and stirring by using an inert solvent as a medium, and are adsorbed on the surface of the pores, wherein the inert solvent is at least one of water, methanol, ethanol, n-hexane, n-heptane, n-octane, benzene, toluene, xylene, etc.; the use amount of the chromium source, the vanadium source and the component Q meets: the content of Cr in the inorganic chromium active component is 0.05-12 wt % of the total weight of the catalyst (based on the weight of Cr); the content of V in the inorganic vanadium active component is 0.05-10 wt % of the total weight of the catalyst (based on the weight of V); the content of sulfur, phosphorus and halogen elements in the catalyst modification component is 0.1-20 wt % of the total weight of the catalyst (based on the total weight of sulfur, phosphorus and halogen elements); impregnation is performed at a temperature of 20-120° C., preferably at 45-90° C., and impregnation is performed for 1-24 h, preferably for 4-12 h; after impregnation, the solvent in the system is evaporated and removed via high temperature to achieve the purpose of drying; the drying is performed at 60-150° C., preferably at 80-130° C., and the drying is performed for 2-24 h, preferably 6-16 h; the process of high-temperature calcination of the chromium source, the vanadium source and the component Q on the surface of the porous inorganic carrier is implemented in nitrogen, or inert gas such as argon and helium, or oxygen-containing atmosphere such as oxygen and dry air; high-temperature calcination is performed at a temperature of 300-900° C., preferably 400-800° C.; the heating rate of the calcination process is 0.1-5° C./min, preferably 0.5-2° C./min, and calcination is performed for 2-24 h, preferably 4-12 h; in the calcination process, before the temperature rises to 150° C., calcination is performed under nitrogen or an inert atmosphere such as argon and helium; when the calcination temperature exceeds 150° C., calcination is performed in an oxygen-containing atmosphere such as oxygen or dry air; and when the calcination ends and the temperature drops below 300-400° C., the oxygen-containing atmosphere is replaced with an inert atmosphere; and in step (1.1) and step (2.1), the calcination process can generally be performed in a fluidized state or a non-fluidized state, but preferably in a fluidized state; calcination is mainly divided into four stages, wherein the first stage is performed at room temperature to 150° C., and this stage mainly removes the water component physically adsorbed on the surface of the inorganic carrier; the second stage is performed at 150° C. to the calcination temperature, and this stage mainly condenses hydroxyl groups on the surface of the inorganic carrier and removes the formed water, and partially decomposes the chromium source, the vanadium source or the component Q impregnated and adsorbed on the surface; the third stage is performed at the calcination temperature, in this stage, the chromium source, the vanadium source or the component Q is almost completely decomposed, and the precursor of the inorganic chromium active component, the precursor of the inorganic vanadium active component and the catalyst modification component are formed, respectively; in this stage, the precursor of the inorganic chromium active component, the precursor of the inorganic vanadium active component, or the catalyst modification component has been formed on the surface of the inorganic carrier, but it is necessary to continue to introduce gas to cool the catalyst to room temperature to facilitate collection. The first stage is performed in an inert gas in order to fully remove the contained water, the second and third stages are performed in an oxygen-containing atmosphere, and in the fourth stage, when the temperature drops to 300-400° C., the working atmosphere is switched from the oxygen-containing atmosphere to the inert gas.

In step (1.2) and step (2.2), the organic chromium source uses an inert organic solvent as a medium, and reacts with the remaining hydroxyl groups on the surface of the porous inorganic carrier by using an impregnation and stirring method so as to be supported on the surface of the carrier; the use amount of the organic chromium source meets: the content of Cr in the organic chromium active component is 0.1-12 wt % of the total weight of the catalyst (based on the weight of Cr); inert organic solvents may be selected from common organic hydrocarbon compounds, such as n-hexane, n-heptane, n-octane, benzene, toluene, and xylene; impregnation is performed at the temperature of 20-120° C., preferably 45-80° C., and impregnation is performed for 1-24 h, preferably 4-8 h; after the impregnation, the organic solvent in the system is evaporated and removed through high temperature to achieve the purpose of drying; drying is performed at the temperature of 60-150° C., preferably 80-130° C., and drying is performed for 2-24 h, preferably 6-16 h; and the whole process is performed under the protection of nitrogen or inert gases such as argon and helium.

In the activation step of the supported three-center catalyst precursor, the organometallic co-catalyst performs pre-reduction and activation treatment on the precursor of the supported three-center catalyst under an inert atmosphere; the molar ratio of the organometallic co-catalyst to the chromium in the precursor of the supported three-center catalyst is 0-1000, preferably 0-100, more preferably 0-50; the pre-reduction and activation treatment is performed at room temperature to 100° C., preferably room temperature to 60° C., and the pre-reduction and activation treatment is performed for 0.5-20 h, preferably 0.5-10 h; the reduction and activation treatment is performed in a mode of stirring, preferably continuous stirring; after the treatment, drying is performed at 60-120° C. for 2-8 h; drying is performed under a nitrogen or inert gas atmosphere, for example, under an atmosphere of nitrogen, helium and argon, preferably under a nitrogen atmosphere; the drying process may also be performed under vacuum conditions, and the obtained pre-reduced and activated supported three-center catalyst is stored under an inert gas atmosphere for use.

In the activation step of the supported three-center catalyst precursor, the in-situ formation of the target catalyst by the reaction of the precursor of the supported three-center catalyst and the organometallic co-catalyst refers to the in-situ reduction and activation treatment in a solvent medium, and the solvent medium may be selected from isopentane, n-pentane, n-hexane, isohexane, n-heptane, n-octane, toluene, and xylene, and is preferably at least one of isopentane, n-hexane, isohexane, and n-heptane; the molar ratio of the metal element in the organometallic co-catalyst to the chromium element in the precursor of the supported three-center catalyst is 0-1000, preferably 0-100, more preferably 0-50; and the in-situ reduction and activation treatment is performed at 20-120° C. for 0.5-5 h.

In the activation step of the supported three-center catalyst precursor, the precursor of the supported three-center catalyst is activated in situ by polymerization monomers to form the target catalyst, which means that the in-situ reduction and activation treatment is performed in a solvent medium, and the solvent medium may be selected from isopentane, n-pentane, n-hexane, isohexane, n-heptane, n-octane, toluene, and xylene, and is preferably at least one of isopentane, n-hexane, isohexane, and n-heptane; the partial pressure of the polymerization monomer is 1-5 MPa, preferably 1.5-3.5 MPa; and in-situ reduction and activation treatment is performed at 50-120° C.

The present invention provides a method for preparing a supported three-center catalyst. The method comprises the following steps:

(I) impregnating a porous inorganic carrier in a solution comprising a chromium source and a vanadium source, drying, and then calcining and activating at the high temperature of 300-900° C.;

(II) impregnating the calcined product obtained in step (I) in a solution comprising an organic chromium source, and then drying to obtain a catalyst precursor for storage; and (III) weighing a certain amount of catalyst precursor obtained in step (II), placing the catalyst precursor in a high-pressure polymerization reactor, forming a target catalyst with catalyst activity in situ through the activation of polymerization monomers, and then starting polymerization reaction.

A preferred method for preparing a supported three-active-center ethylene polymerization catalyst comprises the following steps:

a) adsorbing a solution comprising a chromium source and a vanadium source on the surface of a porous inorganic carrier by using a co-impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

b) placing the above calcined product in a solution comprising a precursor of an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and c) weighing a certain amount of catalyst precursor obtained in step (II) and placing the catalyst precursor in a high-pressure polymerization reactor comprising a certain amount of solvent, forming in situ a target catalyst with catalyst activity through the activation of ethylene monomers, and then starting ethylene polymerization, wherein the solvent medium may be selected from isopentane, n-hexane, n-heptane, n-octane and toluene, preferably isopentane or n-hexane, the catalyst activation and polymerization temperature is 50-110° C., preferably 60-80° C., and the ethylene monomer pressure is 1-5 MPa, preferably 1-3 MPa.

As an example, the specific procedures for preparing the catalyst of the present invention comprise:

impregnating porous amorphous silica gel in an aqueous solution of a certain concentration of ammonium metavanadate and chromium acetate hydroxide, wherein the loading amount of vanadium and chromium relative to the total weight of the catalyst meets the requirements of the present invention (for example, V accounts for 0.1-10 wt %, and Cr accounts for 0.1-2 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing ammonium metavanadate and chromium acetate hydroxide; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the ammonium metavanadate and the chromium acetate hydroxide; wherein the fourth stage of the calcination is a natural cooling stage; switching to protection by nitrogen when the catalyst is cooled to 300-400° C., transferring and storing the catalyst under protection by nitrogen for use; impregnating the above calcined product in chromocene n-hexane solution with a certain concentration, wherein the loading amount of organic chromium relative to the total weight of the catalyst meets the requirements of the present invention (for example, Cr accounts for 0.5-2 wt %), and the impregnation is performed at 45-50° C. for 4-8 h; after the impregnation, heating and drying, wherein the drying is performed at 75-90° C. for 4-8 h, and stirring may be performed in the whole impregnation and drying process; and after drying, transferring the catalyst precursor to anhydrous and oxygen-free conditions under protection by nitrogen for storage; and introducing 1 L of n-hexane into a 2 L high-pressure polymerization reactor, and then adding 0.1 g of catalyst precursor to the polymerization reactor under protection by nitrogen; introducing an ethylene partial pressure of 2 MPa, and performing the in-situ activation of the catalyst precursor and the subsequent polymerization reaction at 90° C.

The present invention provides a method for preparing a supported three-center catalyst. The method comprises the following steps:

(I) impregnating a porous inorganic carrier in a solution comprising a vanadium source, drying, and then calcining and activating at a high temperature of 300-900° C.;

(II) impregnating the calcined product obtained in step (I) in a solution comprising a chromium source, drying, and then calcining and activating at the high temperature of 300-900° C.;

(III) impregnating the calcined product obtained in step (II) in a solution comprising an organic chromium source, and then drying to obtain a catalyst precursor for storage; and (IV) weighing a certain amount of catalyst precursor obtained in step (III), placing the catalyst precursor in a high-pressure polymerization reactor, forming a target catalyst with catalyst activity in situ through the activation of polymerization monomers, and then starting polymerization reaction.

A preferred method for preparing a supported three-active-center ethylene polymerization catalyst comprises the following steps:

a) adsorbing a solution comprising a vanadium source on the surface of a porous inorganic carrier by using a co-impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h, and naturally cooling to room temperature and then storing for use;

b) placing the above calcined product in a solution comprising a chromium source, wherein the impregnation is performed for 1-24 h, preferably 4-12 h, and the impregnation is performed at 20-120° C., preferably 45-90° C.; then drying at 60-150° C., preferably 80-130° C., wherein the drying is performed for 2-24 h, preferably 6-16 h, and vacuum may be used in the drying process; and after the drying, placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use; and c) placing the above calcined product in a solution comprising an organic chromium source for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and d) weighing a certain amount of catalyst precursor obtained in (c) and placing the catalyst precursor in a high-pressure polymerization reactor comprising a certain amount of solvent, forming in situ a target catalyst with catalyst activity through the activation of ethylene monomers, and then starting ethylene polymerization, wherein the solvent medium may be selected from isopentane, n-hexane, n-heptane, n-octane and toluene, preferably isopentane or n-hexane, the catalyst activation and polymerization temperature is 50-110° C., preferably 60-80° C., and the ethylene monomer pressure is 1-5 MPa, preferably 1-3 MPa.

As an example, the specific procedures for preparing the catalyst of the present invention comprise:

impregnating porous amorphous alumina in an aqueous solution of ammonium metavanadate with a certain concentration, wherein the loading amount of vanadium relative to the total weight of the catalyst meets the requirements of the present invention (for example, V accounts for 0.1-10 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing ammonium metavanadate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the ammonium metavanadate; wherein the fourth stage of the calcination is a natural cooling stage; and when the calcined product is cooled to room temperature, collecting the calcined product for use; impregnating the above calcined product in an aqueous solution of chromium nitrate with a certain concentration, wherein the loading amount of chromium relative to the total weight of the catalyst meets the requirements of the present invention (for example, chromium accounts for 0.2-1 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing chromium nitrate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the chromium nitrate; wherein the fourth stage of the calcination is a natural cooling stage; switching to protection by nitrogen when the catalyst is cooled to 300-400° C., transferring and storing the catalyst under protection by nitrogen for use; impregnating the above calcined product in a certain concentration of chromocene n-hexane solution, wherein the loading amount of organic chromium relative to the total weight of the catalyst meets the requirements of the present invention (for example, Cr accounts for 0.5-2 wt %), and the impregnation is performed at 45-50° C. for 4-8 h; after the impregnation, heating and drying, wherein the drying is performed at 75-90° C. for 4-8 h, and stirring may be performed in the whole impregnation and drying process; and after drying, transferring the catalyst to anhydrous and oxygen-free conditions under protection by nitrogen for storage; and introducing 1 L of isopentane into a 2 L high-pressure polymerization reactor, and then adding 0.1 g of catalyst precursor to the polymerization reactor under protection by nitrogen; introducing an ethylene partial pressure of 3 MPa, and performing the in-situ activation of the catalyst precursor and the subsequent polymerization reaction at 100° C.

The present invention provides a method for preparing a supported three-center catalyst. The method comprises the following steps:

(I) impregnating a porous inorganic carrier in a solution comprising a chromium source, drying, and then calcining and activating at a high temperature of 300-900° C.;

(II) impregnating the calcined product obtained in step (I) in a solution comprising a vanadium source, drying, and then calcining and activating at a high temperature of 300-900° C.;

(III) impregnating the calcined product obtained in step (II) in a solution comprising an organic chromium source, and then drying to obtain a catalyst precursor for storage; and (IV) impregnating the catalyst precursor obtained in step (III) in a metal organic co-catalyst solution for pre-reduction and activation to obtain a catalyst.

A preferred method for preparing a supported three-active-center ethylene polymerization catalyst comprises the following steps:

a) adsorbing a solution comprising a chromium source on the surface of a porous inorganic carrier by using an impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h; and then naturally cooling to room temperature and then storing for use;

b) impregnating the above calcined product in a solution comprising a vanadium source, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

c) placing the above calcined product in a solution comprising an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and d) placing the above catalyst precursor in a solution comprising an organometallic co-catalyst for impregnation reaction, wherein the impregnation is performed with an organic solvent as the medium under the protection by inert gas; performing pre-reduction and activation treatment at room temperature to 100° C., preferably room temperature to 60° C., wherein the pre-reduction and activation treatment is performed for 0.5-20 h, preferably 0.5-10 h, and is performed in a mode of stirring, preferably continuous stirring; and after the treatment, drying at 60-120° C. for 2-8 h, wherein the drying is performed in a nitrogen or inert gas atmosphere, such as an atmosphere of nitrogen, helium, and argon, preferably in a nitrogen atmosphere, or the drying process is performed under vacuum conditions; and the addition amount of the organometallic co-catalyst meets the requirement that the molar ratio of organometallic co-catalyst/total chromium is 0-1000, preferably 0-100, more preferably 0-50.

As an example, the specific procedures for preparing the catalyst of the present invention comprise:

impregnating a porous amorphous $SiO_2/Al_2O_3$ carrier in an aqueous solution of chromium acetate with a certain concentration, wherein the loading amount of chromium relative to the total weight of the catalyst meets the requirements of the present invention (for example, Cr accounts for 0.2-0.8 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing chromium acetate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the chromium acetate; wherein the fourth stage of the calcination is a natural cooling stage; and when the calcined product is cooled to room temperature, collecting the calcined product for use; impregnating the above calcined product in an aqueous solution of ammonium metavanadate with a certain concentration, wherein the loading amount of vanadium relative to the total weight of the catalyst meets the requirements of the present invention (for example, V accounts for 0.5-3 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing ammonium metavanadate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the ammonium metavanadate; wherein the fourth stage of the calcination is a natural cooling stage; switching to protection by nitrogen when the catalyst is cooled to 300-400° C., transferring and storing the catalyst under protection by nitrogen for use; and impregnating the above calcined product in an diindenyl chromium n-heptane solution with a certain concentration, wherein the loading amount of organic chromium relative to the total weight of the catalyst meets the requirements of the present invention (for example, Cr accounts for 0.5-2 wt %), and the impregnation is performed at 45-60° C. for 4-8 h; after the impregnation, heating and drying, wherein the drying is performed at 90-100° C. for 4-8 h, and stirring may be performed in the whole impregnation and drying process; after drying, transferring the catalyst to a 1 mol/L triethylaluminium n-hexane solution under protection by nitrogen, wherein the molar ratio of aluminum to total chromium is 5/1; performing pre-reduction and activation treatment at 50° C. for 2 h, wherein in the pre-reduction and activation treatment, continuous stirring is used to strengthen the reaction; and after the treatment, drying for 4 h in a nitrogen atmosphere at 80° C. to finally obtain a target catalyst.

The present invention provides a method for preparing a supported three-center catalyst. The method comprises the following steps:

(I) impregnating a porous inorganic carrier in a solution comprising a chromium source, a vanadium source and a component Q, drying, and then calcining and activating at a high temperature of 300-900° C.;

(II) impregnating the calcined product obtained in step (I) in a solution comprising an organic chromium source, and then drying to obtain a catalyst precursor for storage; and (III) impregnating the catalyst precursor obtained in step (II) in a metal organic co-catalyst solution for pre-reduction and activation to obtain a catalyst.

A preferred method for preparing a supported three-active-center ethylene polymerization catalyst comprises the following steps:

a) adsorbing a solution comprising a chromium source, a vanadium source and a component Q on the surface of a porous inorganic carrier by using a co-impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

b) placing the above calcined product in a solution comprising an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and c) placing the above catalyst precursor in a solution comprising an organometallic co-catalyst for impregnation reaction, wherein the impregnation is performed with an organic solvent as the medium under the protection by inert gas; performing pre-reduction and activation treatment at room temperature to 100° C., preferably room temperature to 60° C., wherein the pre-reduction and activation treatment is performed for 0.5-20 h, preferably 0.5-10 h, and is performed in a mode of stirring, preferably continuous stirring; and after the treatment, drying at 60-120° C. for 2-8 h, wherein the drying is performed in a nitrogen or inert gas atmosphere, such as an atmosphere of nitrogen, helium, and argon, preferably in a nitrogen atmosphere, or the drying process is performed under vacuum conditions; and the addition amount of the organometallic co-catalyst meets the requirement that the molar ratio of organometallic co-catalyst/total chromium is 0-1000, preferably 0-100, more preferably 0-50;

As an example, the specific procedures for preparing the catalyst of the present invention comprise:

impregnating a porous amorphous $SiO_2/TiO_2$ carrier in an aqueous solution of vanadium nitrate, chromium acetate hydroxide and sulfuric acid with a certain concentration, wherein the loading amount of vanadium, chromium and sulfur relative to the total weight of the catalyst meets the requirements of the present invention (for example, V accounts for 0.1-10 wt %, Cr accounts for 0.1-2 wt %, S accounts for 1-5 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing vanadium nitrate, chromium acetate hydroxide and sulfuric acid; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the vanadium nitrate, chromium acetate hydroxide and sulfuric acid; wherein the fourth stage of the calcination is a natural cooling stage; switching to protection by nitrogen when the catalyst is cooled to 300-400° C., transferring and storing the catalyst under protection by nitrogen for use; impregnating the above calcined product in a chromocene n-hexane solution with a certain concentration, wherein the loading amount of organic chromium relative to the total weight of the catalyst meets the requirements of the present invention (for example, Cr accounts for 0.3-1 wt %), and the impregnation is performed at 45-50° C. for 4-8 h; after the impregnation, adding a 1 mol/L n-hexane solution of aluminum diethyl monochloride, so that the molar ratio of aluminum to total chromium is 3/1; performing pre-reduction and activation treatment at 50° C. for 2 h, wherein in the pre-reduction and activation treatment, continuous stirring is used to strengthen the reaction; and after the treatment, drying for 4 h in a nitrogen atmosphere at 80° C. to finally obtain a target catalyst.

The present invention provides a method for preparing a supported three-center catalyst. The method comprises the following steps:

(I) impregnating a porous inorganic carrier in a solution comprising a vanadium source and the component Q, drying, and then calcining and activating at the high temperature of 300-900° C.;

(II) impregnating the calcined product obtained in step (I) in a solution comprising a chromium source, drying, and then calcining and activating at the high temperature of 300-900° C.;

(III) impregnating the calcined product obtained in step (II) in a solution comprising an organic chromium source, and then drying to obtain a catalyst precursor for storage; and (IV) impregnating the catalyst precursor obtained in step (III) in a metal organic co-catalyst solution for pre-reduction and activation to obtain a catalyst.

A preferred method for preparing a supported three-active-center ethylene polymerization catalyst comprises the following steps:

a) adsorbing a solution comprising a vanadium source and the component Q on the surface of a porous inorganic carrier by using a co-impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h, and naturally cooling to room temperature and then storing for use;

b) placing the above calcined product in a solution comprising a chromium source, wherein the impregnation is performed for 1-24 h, preferably 4-12 h, and the impregnation is performed at 20-120° C., preferably 45-90° C.; then drying at 60-150° C., preferably 80-130° C., wherein the drying is performed for 2-24 h, preferably 6-16 h, and vacuum may be used in the drying process; and after the drying, placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use; and c) placing the above calcined product in a solution comprising an organic chromium source for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and d) placing the above catalyst precursor in a solution comprising an organometallic co-catalyst for impregnation reaction, wherein the impregnation is performed with an organic solvent as the medium under the protection by inert gas; performing pre-reduction and activation treatment at room temperature to 100° C., preferably room temperature to 60° C., wherein the pre-reduction and activation treatment is performed for 0.5-20 h, preferably 0.5-10 h, and is performed in a mode of stirring, preferably continuous stirring; and after the treatment, drying at 60-120° C. for 2-8 h, wherein the drying is performed in a nitrogen or inert gas atmosphere, such as an atmosphere of nitrogen, helium, and argon, preferably in a nitrogen atmosphere, or the drying process is performed under vacuum conditions; and the addition amount of the organometallic co-catalyst meets the requirement that the molar ratio of organometallic co-catalyst/total chromium is 0-1000, preferably 0-100, more preferably 0-50.

As an example, the specific procedures for preparing the catalyst of the present invention comprise:

impregnating a porous amorphous $SiO_2/Nb_2O_5$ carrier in an aqueous solution of ammonium metavanadate and ammonium sulfate with a certain concentration, wherein the loading amount of vanadium and sulfur relative to the total weight of the catalyst meets the requirements of the present invention (for example, V accounts for 0.1-10 wt %, S accounts for 1-3 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing ammonium metavanadate and ammonium sulfate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the ammonium metavanadate and ammonium sulfate; wherein the fourth stage of the calcination is a natural cooling stage; and when the calcined product is cooled to room temperature, collecting the calcined product for use; impregnating the above calcined product in an aqueous solution of chromium nitrate with a certain concentration, wherein the loading amount of chromium relative to the total weight of the catalyst meets the requirements of the present invention (for example, Cr accounts for 0.2-1 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing chromium nitrate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the chromium nitrate; wherein the fourth stage of the calcination is a natural cooling stage; switching to protection by nitrogen when the catalyst is cooled to 300-400° C., transferring and storing the catalyst under protection by nitrogen for use; impregnating the above calcined product in a diindenyl chromium n-hexane solution with a certain concentration, wherein the loading amount of organic chromium relative to the total weight of the catalyst meets the requirements of the present invention (for example, Cr accounts for 0.5-2 wt %), and the impregnation is performed at 45-50° C. for 4-8 h; after the impregnation, adding a 1 mol/L toluene solution of methylaluminoxane, so that the molar ratio of aluminum to total chromium is 300/1; performing pre-reduction and activation treatment at 50° C. for 2 h, wherein in the pre-reduction and activation treatment, continuous stirring is used to strengthen the reaction; and after the treatment, drying for 4 h in a nitrogen atmosphere at 120° C. to finally obtain a target catalyst.

The present invention provides a method for preparing a supported three-center catalyst. The method comprises the following steps:

(I) impregnating a porous inorganic carrier in a solution comprising a chromium source and the component Q, drying, and then calcining and activating at the high temperature of 300-900° C.;

(II) impregnating the calcined product obtained in step (I) in a solution comprising a vanadium source, drying, and then calcining and activating at the high temperature of 300-900° C.;

(III) impregnating the calcined product obtained in step (II) in a solution comprising an organic chromium source, and then drying to obtain a catalyst precursor for storage; and (IV) sequentially introducing a certain amount of solvent, organometallic co-catalyst solution and ethylene monomer into the high-pressure polymerization reactor, and then weighing a certain amount of catalyst precursor in (III) and introducing the same into the polymerization reactor, using the co-catalyst to reduce the catalyst precursor in situ to obtain the target catalyst, and subsequently catalyzing the polymerization of ethylene.

A preferred method for preparing a supported three-active-center ethylene polymerization catalyst comprises the following steps:

a) adsorbing a solution comprising a chromium source and the component Q on the surface of a porous inorganic carrier by using an impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h; and then naturally cooling to room temperature and then storing for use;

b) impregnating the above calcined product in a solution comprising a vanadium source, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

c) placing the above calcined product in a solution comprising an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and d) sequentially introducing a certain amount of solvent, organometallic co-catalyst, ethylene monomers and the catalyst precursor of step (c) into the high-pressure polymerization reactor to start catalyst activation and ethylene polymerization, wherein the solvent medium may be selected from isopentane, n-hexane, n-heptane, n-octane, and toluene, preferably isopentane or n-hexane, the organometallic co-catalyst may be selected from alkyl aluminum and a derivative thereof, alkyl lithium, alkyl boron, preferably aluminum alkyl, the molar ratio of the organometallic co-catalyst to the total chromium is 0-1000, preferably 10-30, the catalyst activation and polymerization is performed at 50-110° C., preferably 60-80° C., and the ethylene monomer pressure is 0.5-5 MPa, preferably 1-3 MPa.

As an example, the specific procedures for preparing the catalyst of the present invention comprise:

impregnating a porous amorphous $SiO_2/Al_2O_3$ carrier in an aqueous solution of chromium acetate and ammonium fluorosilicate with a certain concentration, wherein the loading amount of chromium and fluorine relative to the total weight of the catalyst meets the requirements of the present invention (for example, Cr accounts for 0.2-0.8 wt %, F accounts for 0.5-2 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing chromium acetate and ammonium fluorosilicate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the chromium acetate and ammonium fluorosilicate; wherein the fourth stage of the calcination is a natural cooling stage; and when the calcined product is cooled to room temperature, collecting the calcined product for use; impregnating the above calcined product in an aqueous solution of ammonium metavanadate with a certain concentration, wherein the loading amount of vanadium relative to the total weight of the catalyst meets the requirements of the present invention (for example, V accounts for 0.5-3 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing ammonium metavanadate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the ammonium metavanadate; wherein the fourth stage of the calcination is a natural cooling stage; switching to protection by nitrogen when the catalyst is cooled to 300-400° C., transferring and storing the catalyst under protection by nitrogen for use; impregnating the above calcined product in a certain concentration of diindenyl chromium n-heptane solution, wherein the loading amount of organic chromium relative to the total weight of the catalyst meets the requirements of the present invention (for example, Cr accounts for 0.5-2 wt %), and the impregnation is performed at 45-60° C. for 4-8 h; after the impregnation, heating and drying, wherein the drying is performed at 90-100° C. for 4-8 h, and stirring may be performed in the whole impregnation and drying process; and after drying, transferring the catalyst to anhydrous and oxygen-free conditions under protection by nitrogen for storage; and then under the protection by nitrogen, sequentially introducing 1 L of isopentane, a certain amount of 1 mol/L triisobutylaluminum n-hexane solution, 3 MPa ethylene partial pressure and a certain amount of catalyst precursor into a 2 L high-pressure polymerization reactor to make the molar ratio of aluminum to total chromium is 10/1, and performing in-situ activation of the catalyst precursor and the subsequent polymerization reaction at 100° C.

The present invention provides a method for preparing a supported three-center catalyst. The method comprises the following steps:
  (I) impregnating a porous inorganic carrier in a solution comprising a vanadium source, drying, and then calcining and activating at the high temperature of 300-900° C.;
  (II) impregnating the calcined product obtained in step (I) in a solution comprising a chromium source and the component Q, drying, and then calcining and activating at the high temperature of 300-900° C.;
  (III) impregnating the calcined product obtained in step (II) in a solution comprising an organic chromium source, and then drying to obtain a catalyst precursor for storage; and
  (IV) sequentially introducing a certain amount of solvent, organometallic co-catalyst solution and ethylene monomer into the high-pressure polymerization reactor, and then weighing a certain amount of catalyst precursor in step (III) and introducing the same into the polymerization reactor, using the co-catalyst to reduce the catalyst precursor in situ to obtain the target catalyst, and subsequently catalyzing the polymerization of ethylene.

A preferred method for preparing a supported three-active-center ethylene polymerization catalyst comprises the following steps:
  a) adsorbing a solution comprising a vanadium source on the surface of a porous inorganic carrier by using a co-impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h, and naturally cooling to room temperature and then storing for use;
  b) placing the above calcined product in a solution comprising a chromium source and the component Q, wherein the impregnation is performed for 1-24 h, preferably 4-12 h, and the impregnation is performed at 20-120° C., preferably 45-90° C.; then drying at 60-150° C., preferably 80-130° C., wherein the drying is performed for 2-24 h, preferably 6-16 h, and vacuum may be used in the drying process; and after the drying, placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use; and
  c) placing the above calcined product in a solution comprising an organic chromium source for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and
  d) sequentially introducing a certain amount of solvent, organometallic co-catalyst, ethylene monomers and the catalyst precursor of step (c) into the high-pressure polymerization reactor to start catalyst activation and ethylene polymerization, wherein the solvent medium may be selected from isopentane, n-hexane, n-heptane, n-octane, and toluene, preferably isopentane or n-hexane, the organometallic co-catalyst may be selected from alkyl aluminum and a derivative thereof, alkyl lithium, alkyl boron, preferably aluminum alkyl, the molar ratio of the organometallic co-catalyst to the total chromium is 0-1000, preferably 10-30, the catalyst activation and polymerization is performed at 50-110° C., preferably 60-80° C., and the ethylene monomer pressure is 0.5-5 MPa, preferably 1-3 MPa.

As an example, the specific procedures for preparing the catalyst of the present invention comprise:

impregnating porous amorphous silica gel in an aqueous solution of ammonium metavanadate with a certain concentration, wherein the loading amount of vanadium relative to the total weight of the catalyst meets the requirements of the present invention (for example, V accounts for 1.0-10 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing ammonium metavanadate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the ammonium metavanadate; wherein the fourth stage of the calcination is a natural cooling stage; and when the calcined product is cooled to room temperature, collecting the calcined product for use; impregnating the above calcined product in an aqueous solution of chromium nitrate and ammonium phosphate with a certain concentration, wherein the loading amount of chromium and phosphorus relative to the total weight of the catalyst meets the requirements of the present invention (for example, Cr accounts for 0.2-1 wt %, P accounts for 0.5-2 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing chromium nitrate and ammonium phosphate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the chromium nitrate and ammonium phosphate; wherein the fourth stage of the calcination is a natural cooling stage; switching to protection by nitrogen when the catalyst is cooled to 300-400° C., transferring and storing the catalyst under protection by nitrogen for use; impregnating the above calcined product in a certain concentration of difluorenyl chrome n-hexane solution, wherein the loading amount of organic chromium relative to the total weight of the catalyst meets the requirements of the present invention (for example, Cr accounts for 0.5-2 wt %), and the impregnation is performed at 45-60° C. for 4-8 h; after the impregnation, heating and drying, wherein the drying is performed at 75-90° C. for 4-8 h, and stirring may be performed in the whole impregnation and drying process; and after drying, transferring the catalyst to anhydrous and oxygen-free conditions under protection by nitrogen for storage; and then under the protection by nitrogen, sequentially introducing 1 L of isopentane, a certain amount of 1 mol/L triisobutylaluminum n-hexane solution, 1 MPa ethylene partial pressure and a certain amount of catalyst precursor into a 2 L high-pressure polymerization reactor to make the molar ratio of aluminum to total chromium is 4/1, and performing in-situ activation of the catalyst precursor and the subsequent polymerization reaction at 100° C.

The present invention provides a method for preparing a supported three-center catalyst. The method comprises the following steps:

(I) impregnating a porous inorganic carrier in a solution comprising a chromium source, drying, and then calcining and activating at the high temperature of 300-900° C.;

(II) impregnating the calcined product obtained in step (I) in a solution comprising a vanadium source and the component Q, drying, and then calcining and activating at the high temperature of 300-900° C.;

(III) impregnating the calcined product obtained in step (II) in a solution comprising an organic chromium source, and then drying to obtain a catalyst precursor for storage; and (IV) sequentially introducing a certain amount of solvent, organometallic co-catalyst solution and ethylene monomer into the high-pressure polymerization reactor, and then weighing a certain amount of catalyst precursor in step (III) and introducing the same into the polymerization reactor, using the co-catalyst to reduce the catalyst precursor in situ to obtain the target catalyst, and subsequently catalyzing the polymerization of ethylene.

A preferred method for preparing a supported three-active-center ethylene polymerization catalyst comprises the following steps:

a) adsorbing a solution comprising a chromium source on the surface of a porous inorganic carrier by using an impregnation method, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h; and then naturally cooling to room temperature and then storing for use;

b) impregnating the above calcined product in a solution comprising a vanadium source and the component Q, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

c) placing the above calcined product in a solution comprising an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and d) sequentially introducing a certain amount of solvent, organometallic co-catalyst, ethylene monomers and the catalyst precursor of step (c) into the high-pressure polymerization reactor to start catalyst activation and ethylene polymerization, wherein the solvent medium may be selected from isopentane, n-hexane, n-heptane, n-octane, and toluene, preferably isopentane or n-hexane, the organometallic co-catalyst may be selected from alkyl aluminum and a derivative thereof, alkyl lithium, alkyl boron, preferably aluminum alkyl, the molar ratio of the organometallic co-catalyst to the total chromium is 0-1000, preferably 10-30, the catalyst activation and polymerization is performed at 50-110° C., preferably 60-80° C., and the ethylene monomer pressure is 0.5-5 MPa, preferably 1-3 MPa.

As an example, the specific procedures for preparing the catalyst of the present invention comprise:

impregnating a porous amorphous $SiO_2/Al_2O_3$ carrier in an aqueous solution of chromium acetate with a certain concentration, wherein the loading amount of chromium relative to the total weight of the catalyst meets the requirements of the present invention (for example, Cr accounts for 0.2-0.8 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing chromium acetate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the chromium acetate; wherein the fourth stage of the calcination is a natural cooling stage; and when the calcined product is cooled to room temperature, collecting the calcined product for use; impregnating the above calcined product in an aqueous solution of ammonium metavanadate and ammonium fluorosilicate with a certain concentration, wherein the loading amount of vanadium and fluorine relative to the total weight of the catalyst meets the requirements of the present invention (for example, V accounts for 0.5-3 wt %, F accounts for 1-3 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-800° C.); calcining and removing part of the hydroxyl groups on the surface of silica gel in dry air, and partially oxidizing and decomposing ammonium metavanadate and ammonium fluorosilicate; wherein the third stage of calcination is a constant temperature stage (for example, a constant temperature of 800° C. for 4-12 h); calcining in dry air to further remove hydroxyl groups on the surface of silica gel, and almost completely oxidizing and decomposing the ammonium metavanadate and ammonium fluorosilicate; wherein the fourth stage of the calcination is a natural cooling stage; switching to protection by nitrogen when the catalyst is cooled to 300-400° C., transferring and storing the catalyst under protection by nitrogen for use; impregnating the above calcined product in a certain concentration of chromocene n-heptane solution, wherein the loading amount of organic chromium relative to the total weight of the catalyst meets the requirements of the present invention (for example, Cr accounts for 0.5-2 wt %), and the impregnation is performed at 45-60° C. for 4-8 h; after the impregnation, heating and drying, wherein the drying is performed at 90-100° C. for 4-8 h, and stirring may be performed in the whole impregnation and drying process; and after drying, transferring the catalyst to anhydrous and oxygen-free conditions under protection by nitrogen for storage; and then under the protection by nitrogen, sequentially introducing 1 L of isopentane, a certain amount of 1 mol/L triisobutylaluminum n-hexane solution, 1 MPa ethylene partial pressure and a certain amount of catalyst precursor into a 2 L high-pressure polymerization reactor to make the molar ratio of aluminum to total chromium is 15/1, and performing in-situ activation of the catalyst precursor and the subsequent polymerization reaction at 95° C.

The present invention provides a method for preparing a supported three-center catalyst. The method comprises the following step:

(I) impregnating a porous inorganic carrier in a solution comprising the component Q, drying, and then calcining and activating at the high temperature of 300-900° C.;

(II) impregnating the calcined product obtained in (I) in a solution comprising a vanadium source, drying, and then calcining and activating at the high temperature of 300-900° C.;

(III) impregnating the calcined product obtained in step (II) in a solution comprising a chromium source, and then drying to obtain a catalyst precursor for storage; and (IV) impregnating the calcined product obtained in step (III) in a solution comprising an organic chromium source, and then drying to obtain a catalyst precursor for storage; and (V) sequentially introducing a certain amount of solvent, organometallic co-catalyst solution and ethylene monomer into the high-pressure polymerization reactor, and then weighing a certain amount of catalyst precursor in step (IV) and introducing the same into the polymerization reactor, using the co-catalyst to reduce the catalyst precursor in situ to obtain the target catalyst, and subsequently catalyzing the polymerization of ethylene.

A preferred method for preparing a supported three-active-center ethylene polymerization catalyst comprises the following steps:

a) adsorbing a solution comprising the component Q on the surface of a porous inorganic carrier by using an impregnation method, wherein the impregnation is performed for 1-24 h, preferably 4-12 h, and the impregnation is performed at 20-120° C., preferably 45-90° C.; drying at 60-150° C., preferably 80-130° C., where the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 350-500° C., and the calcination is performed for 2-24 h, preferably 4-12 h; and then naturally cooling to room temperature and then storing for use;

b) impregnating the above calcined product in a solution comprising a vanadium source, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-600° C., and the calcination is performed for 2-24 h, preferably 4-12 h; and then naturally cooling to room temperature and then storing for use;

c) impregnating the above calcined product in a solution comprising a chromium source, wherein the impregnation is performed for 1-24 h, preferably 4-12 h, and the impregnation is performed at 20-120° C., preferably 45-90° C.; drying at 60-150° C., preferably 80-130° C., wherein the drying is performed for 2-24 h, more preferably 6-16 h, and vacuum may be used in the drying process; placing the dried mixture in an inert gas or oxygen-containing atmosphere for high-temperature calcination and activation, wherein the calcination is performed at 300-900° C., preferably 400-800° C., and the calcination is performed for 2-24 h, preferably 4-12 h; cooling, switching the atmosphere to an inert gas when it is cooled to 300-400° C., and naturally cooling to room temperature and then storing for use;

d) placing the above calcined product in a solution comprising an organic chromium catalyst for impregnation reaction, wherein the impregnation is performed for 1-24 h, preferably 4-8 h, and the impregnation is performed at 20-120° C., preferably 45-80° C.; then drying at 60-150° C., preferably 80-130° C., wherein the drying is performed for 2-24 h, preferably 6-16 h, and vacuum may be used in the drying process; and after the drying, obtaining a catalyst precursor; and e) sequentially introducing a certain amount of solvent, organometallic co-catalyst, ethylene monomers and catalyst precursor in (d) into the high-pressure polymerization reactor to start catalyst activation and ethylene polymerization, wherein the solvent medium may be selected from isopentane, n-hexane, n-heptane, n-octane, and toluene, preferably isopentane or n-hexane, the organometallic co-catalyst may be selected from alkyl aluminum and a derivative thereof, alkyl lithium, alkyl boron, preferably aluminum alkyl, the molar ratio of the organometallic co-catalyst to the total chromium is 0-1000, preferably 10-30, the catalyst activation and polymerization is performed at 50-110° C., preferably 60-80° C., and the ethylene monomer pressure is 0.5-5 MPa, preferably 1-3 MPa.

As an example, the specific procedures for preparing the catalyst of the present invention comprise:

impregnating a porous amorphous $SiO_2$ carrier in an aqueous solution of ammonium phosphate with a certain concentration, wherein the loading amount of phosphorus relative to the total weight of the catalyst meets the requirements of the present invention (for example, P accounts for 1-2 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and ammonium phosphate is decomposed into catalyst modification components; wherein the third stage of calcination is a constant temperature stage (for example, a constant temperature of 500° C. for 4-12 h); calcining in dry air to further remove hydroxyl groups on the surface of silica gel, and ammonium phosphate is further decomposed; wherein the fourth stage of the calcination is a natural cooling stage; and when the calcined product is cooled to room temperature, collecting the calcined product for use; impregnating the above calcined product in an aqueous solution of a certain concentration of ammonium metavanadate, wherein the loading amount of vanadium relative to the total weight of the catalyst meets the requirements of the present invention (for example, V is 0.5-3 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing ammonium metavanadate; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the ammonium metavanadate; wherein the fourth stage of the calcination is a natural cooling stage; and when the calcined product is cooled to room temperature, storing the calcined product in a dry environment for use; impregnating the above calcined product in an aqueous solution of chromium acetate hydroxide with a certain concentration, wherein the loading amount of chromium relative to the total weight of the catalyst meets the requirements of the present invention (for example, Cr accounts for 0.5-1 wt %); after stirring continuously for a certain period of time (for example, 4-8 h), heating and drying; then performing high-temperature calcination in a fluidized bed, wherein the first stage of calcination is a heating stage (for example, at 100-150° C.), and physical water adsorbed in the carrier is calcined and removed in the nitrogen atmosphere; the second stage of the calcination is a heating stage (for example, 150-500° C.); calcining and removing part of the hydroxyl groups on the surface of silica gel in dry air, and partially oxidizing and decomposing the chromium acetate hydroxide; wherein the third stage of calcination is a constant temperature stage (for example, a constant temperature of 500° C. for 4-12 h); calcining in dry air to further remove hydroxyl groups on the surface of silica gel, and almost completely oxidizing and decomposing the chromium acetate hydroxide; wherein the fourth stage of the calcination is a natural cooling stage; switching to protection by nitrogen when the catalyst is cooled to 200-300° C., transferring and storing the catalyst under protection by nitrogen for use; impregnating the above calcined product in a certain concentration of diindenyl chromium n-heptane solution, wherein the loading amount of organic chromium relative to the total weight of the catalyst meets the requirements of the present invention (for example, Cr accounts for 0.5-2 wt %), and the impregnation is performed at 45-60° C. for 4-8 h; after the impregnation, heating and drying, where the drying is performed at 90-100° C. for 4-8 h, and stirring may be performed in the whole impregnation and drying process; and after drying, transferring the catalyst to anhydrous and oxygen-free conditions under protection by nitrogen for storage; and then under the protection by nitrogen, sequentially introducing 1 L of isopentane, a certain amount of 1 mol/L triisobutylaluminum n-hexane solution, 2 MPa ethylene partial pressure and a certain amount of catalyst precursor into a 2 L high-pressure polymerization reactor to make the molar ratio of aluminum to total chromium is 10/1, and performing in-situ activation of the catalyst precursor and the subsequent polymerization reaction at 105° C.

Provided are use of the above supported three-center catalyst ethylene in catalyzation of olefin polymerization, and especially use in catalyzation the homopolymerization of ethylene or the copolymerization of ethylene and α-olefins.

The olefins generally comprise ethylene monomers, and may also comprise comonomers; the comonomers may be α-olefins with 3-20 carbon atoms, such as propylene, 1-butene, 1-pentene, 1-hexene, 1-heptene, 1-octene, 1-nonene, 1-decene, 1-dodecene, 1-methyl-1-pentene, 4-methyl-1-hexene, etc., and these can be used alone or a combination of two or more thereof may be used. The comonomers are preferably at least one of 1-butene, 1-hexene, 1-octene and 1-decene; when the comonomers are present, the amount of the comonomers is generally 0-30 vol %, preferably 0-10 vol %, and the amount of the comonomers added is calculated based on the volume concentration of the comonomers relative to the solvent during polymerization.

When the supported three-center catalyst is used to catalyze the homopolymerization of ethylene or the copolymerization of ethylene and α-olefins, the produced polyethylene product has the following characteristics: for both ethylene homopolymerization and copolymerization with α-olefins, polymer products with wide molecular weight distribution could be obtained and mostly presented as trimodal distribution. Furthermore, the copolymer products comprise ethylene homopolymer with lower molecular weight, copolymers of medium and high molecular weight, and copolymers of high molecular weight or ultra-high molecular weight.

In the use of the supported three-center catalyst ethylene in catalyzation of olefin polymerization, an organometallic co-catalyst, a molecular weight regulator, etc. can be added during the polymerization process if needed; and the organometallic co-catalyst may be an organoaluminum compound, such as triethylaluminum, triisobutylaluminium, diethylaluminum, aluminium diethyl monochloride, and methyl aluminoxane. The amount of the organometallic aluminum compound meets: the molar ratio of aluminum element to total chromium element is 0-1000, preferably 0-70, more preferably 0-50; the molecular weight regulator may be hydrogen; and the use of the supported three-center catalyst in catalyzation of olefin polymerization does not have any special restrictions on the polymerization method. When used to catalyze the homopolymerization of ethylene or the copolymerization of ethylene and α-olefins, the polymerization method may comprise a gas phase polymerization process, a slurry polymerization process, a suspension polymerization process, a bulk polymerization process, a solution polymerization process, etc. In addition, the method also comprises processes with two cascaded reactorss. As understood by those skilled in the art, the method for producing olefin polymers with the catalyst of the present invention is not particularly limited, and the gas phase polymerization process, the slurry polymerization process, the suspension polymerization process, the bulk polymerization process, the solution polymerization process, the processes with two cascaded reactors, etc. known in the art can be used for implementation under conventional embodiments and polymerization conditions.

Preferably, when the slurry polymerization process is used for polymerization, the process comprises adding ethylene to a reactor, then adding a solvent and a co-catalyst (an organoaluminum compound), optionally adding hydrogen and comonomers, and finally adding the supported three-center catalyst of the present invention for polymerization. The solvent used is generally any solvent known in the art for olefin polymerization, and may be an alkane with 3-20 carbon atoms, such as propane, n-butane, isobutane, n-pentane, isopentane, neopentane, n-hexane, cyclohexane, n-heptane, and n-octane; and these solvents can be used alone or a combination of two or more thereof may be used. The solvent used is preferably isobutane, isopentane, n-hexane, cyclohexane, n-heptane, or the like.

More preferably, when the conventional slurry polymerization process is used for the polymerization, the specific operation is as follows: firstly, a polymerization reactor is heated under vacuum to remove impurities, then the vacuum is replaced with high-purity nitrogen; the operations are repeated three times, then replacement is performed with a small amount of ethylene monomer, and finally the reactor is filled with ethylene to slightly positive pressure (0.12 MPa); a dehydrated and deoxygenated refined solvent such as n-heptane is added into the reactor, and a certain amount of alkyl aluminum is used as a co-catalyst; in a hydrogen modulation and copolymerization experiment, it is also necessary to add a certain amount of hydrogen and comonomers separately, and when the ethylene pressure is adjusted to 1 MPa, the catalyst of the present invention is finally added to start the polymerization; instantaneous consumption of monomer ethylene is collected online and recorded by a computer during the reaction process; after the reaction is performed at a temperature (for example, 35° C. to 100° C.) for a certain period of time (for example, 1 h), the reaction is terminated by adding a hydrochloric acid/ethanol mixed solution; and the polymer is washed, dried under vacuum, weighed and analyzed.

Compared with the prior art, the present invention has the following advantages and beneficial effects:

In the present invention, a supported three-center catalyst is developed and used for ethylene polymerization. The three active centers in the catalyst can better show their respective catalytic performance, and even show a good catalytic synergistic effect. Compared with the conventional single- and double-center catalysts, the supported three-center catalyst mainly features that the polymer molecular weight distribution is wider and the trimodal or multimodal distribution is present; the catalyst comprises an ethylene homopolymer A with a lower molecular weight synthesized from organic chromium active centers, an ethylene copolymer B with a medium molecular weight synthesized from inorganic chromium active centers, and an ethylene copolymer C with a high molecular weight or ultra-high molecular weight synthesized from inorganic vanadium active centers; the relative contents of the three components A, B, C can be adjusted mainly by adjusting the relative contents of the three active centers in the catalyst, and it is convenient to adjust the molecular weights and molecular weight distributions of the ethylene homopolymer and the ethylene/α-olefin copolymer, as well as the content and distribution of comonomers under polymerization conditions as the use amount of the co-catalyst, the polymerization temperature and the molecular weight regulator. Obviously, compared with the three-stage process, the use of the supported three-center catalyst of the present invention to synthesize polyethylene with a broad or trimodal distribution in a single pot or two pots in series is more economical, green and efficient.

Compared with most existing catalysts, the supported three-center catalyst of the present invention has the following characteristics: the catalyst of the present invention can be used to produce, in a single reactor or two reactors in series, ethylene homopolymers and ethylene/α-olefin copolymers with a broader or even trimodal molecular weight distribution, and the catalyst comprises an ethylene homopolymer with a lower molecular weight, an ethylene and α-olefin copolymer with a medium and high molecular weight, and an ethylene and α-olefin copolymer with a high molecular weight or ultra-high molecular weight. The catalyst further has higher ethylene homopolymerization and ethylene and α-olefin copolymerization reaction activity.

DETAILED DESCRIPTION OF THE INVENTION

Figure 1:
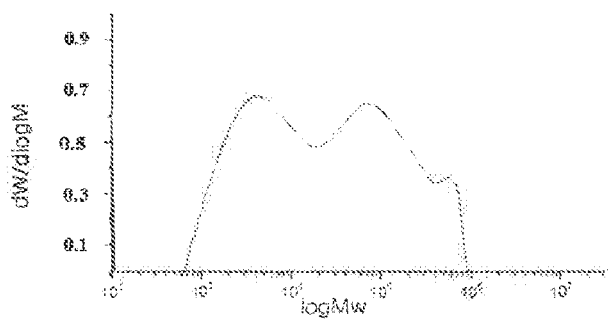
FIG. 1 is a high temperature GPC curve of a trimodal polyethylene product prepared by using a three-stage technology.

The present invention is described in further detail below with reference to examples and accompanying drawings, but implementations of the present invention are not limited thereto.

Reagents used in the examples can be conventionally purchased from the market unless otherwise specified.

The properties of various polymers in the examples are measured using the following methods:

High Temperature Gel Chromatography (HT-GPC)

The weight-average molecular weight and molecular weight distribution are measured by high temperature gel chromatography. In this experiment, a PL-220 high temperature gel permeation chromatograph (Polymer Laboratories) was used to determine the molecular weight of polyethylene and its molecular weight distribution. Where needed to analyze the distribution of short-chain branches, an infrared detector (IR4, PolymerChar) is combined with HT-GPC for measurement. In the experiment, measurement was performed at 160° C. by using 1,2,4-trichlorobenzene as a solvent. Data is processed by using a universal correction method with narrowly-distributed polystyrene as a standard sample.

$^{13}$C High-Temperature Nuclear Magnetic Resonance Spectrometry (HT-$^{13}$CNMR)

The short-chain branch content of the polymer was measured by using high-temperature NMR carbon spectroscopy. In this experiment, a BrukerAvance III 500 nuclear magnetic resonance spectrometer was used to measure the short-chain branch content of polyethylene. In the experiment, measurement was performed at 110° C. by using deuterated p-dichlorobenzene as a solvent, and a carbon signal on a polyethylene main chain (displacement at 30.00 ppm) was used as an internal standard to calculate the short-chain branch content.

Example 1

10 g of silica gel (with a specific surface area of 500 m²/g, a pore volume of 1.3 ml/g, and a pore diameter of 20 nm) was impregnated in an aqueous solution of vanadyl oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used in a constant temperature stage of 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 2

10 g of $SiO_2/Al_2O_3$ (with a specific surface area of 600 m$^2$/g, a pore volume of 1.1 ml/g, an aluminum content of 5 wt %, and a pore size of 17 nm) was impregnated in an ethanol solution of vanadiumoxy acetylacetonate (the loading amount of V relative to the total weight of the catalyst was 0.25 wt %), the immersion with continuous stirring was performed at 40° C. for about 4 h, then the temperature was raised to 100° C., and drying with the continuous stirring was performed for 8 h. The dried mixture was placed in a fluidized bed and calcined at a temperature starting from room temperature with a heating rate of 1° C./min. When the temperature reached 500° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 500° C.; a dry air atmosphere was used when the temperature was reduced from 500° C. to 300° C. during natural cooling, and the atmosphere was switched to a nitrogen atmosphere when the temperature was lower than 300° C. The above calcined product was impregnated in an aqueous solution of chromium acetate hydroxide (the loading amount of Cr was 0.7 wt % relative to the total weight of the catalyst), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 3

10 g of $SiO_2/TiO_2$ (with a specific surface area of 500 m$^2$/g, a pore volume of 1.2 ml/g, a titanium content of 5 wt %, and a pore size of 25 nm) was impregnated in an aqueous solution of chromium nitrate (the loading amount of Cr relative to the total weight of the catalyst was 0.7 wt %), the immersion with continuous stirring was performed at 40° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 450° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 450° C.; a dry air atmosphere was used when the temperature was reduced from 450° C. to 300° C. during natural cooling, and the atmosphere was switched to a nitrogen atmosphere when the temperature was lower than 300° C. The above calcined product was impregnated in an aqueous solution of ammonium metavanadate (the loading amount of V was 0.27 wt % relative to the total weight of the catalyst), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 4

10 g of $SiO_2/Al_2O_3$ (with a specific surface area of 600 m$^2$/g, a pore volume of 1.1 ml/g, an aluminum content of 5 wt %, and a pore size of 17 nm) was impregnated in an aqueous solution of vanadium oxalate, chromium acetate hydroxide and ammonium hexafluorosilicate (the loading amounts of V, Cr and F relative to the total weight of the catalyst were 0.25 wt %, 0.7 wt % and 2 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the product was naturally cooled to room temperature and transferred to anhydrous and oxygen-free conditions for storing. In the above process, a nitrogen atmosphere was used at room temperature to 150° C.; a dry air atmosphere was used from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 5

10 g of $SiO_2/Al_2O_3$ (with a specific surface area of 600 m$^2$/g, a pore volume of 1.1 ml/g, an aluminum content of 5 wt %, and a pore size of 17 nm) was impregnated in an ethanol solution of vanadiumoxy acetylacetonate and methanesulfonic acid (the loading amounts of V and S relative to the total weight of the catalyst were 0.25 wt % and 1.7 wt %, respectively), the immersion with continuous stirring was performed at 40° C. for about 4 h, then the temperature was raised to 100° C., and drying with the continuous stirring was performed for 8 h. The dried mixture was placed in a fluidized bed and calcined at a temperature starting from room temperature with a heating rate of 1° C./min. When the temperature reached 500° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 500° C.; a dry air atmosphere was used when the temperature was reduced from 500° C. to 300° C. during natural cooling, and the atmosphere was switched to a nitrogen atmosphere when the temperature was lower than 300° C. The above calcined product was impregnated in an aqueous solution of chromium acetate hydroxide (the loading amount of Cr was 0.7 wt % relative to the total weight of the catalyst), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 6

10 g of $SiO_2/TiO_2$ (with a specific surface area of 500 m$^2$/g, a pore volume of 1.2 ml/g, a titanium content of 5 wt %, and a pore size of 25 nm) was impregnated in an aqueous solution of chromium nitrate and ammonium phosphate (the loading amounts of Cr and P relative to the total weight of the catalyst were 0.7 wt % and 2.2 wt %, respectively), the immersion with continuous stirring was performed at 40° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 450° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 450° C.; a dry air atmosphere was used when the temperature was reduced from 450° C. to 300° C. during natural cooling, and the atmosphere was switched to a nitrogen atmosphere when the temperature was lower than 300° C. The above calcined product was impregnated in an aqueous solution of ammonium metavanadate (the loading amount of V was 0.25 wt % relative to the total weight of the catalyst), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.6 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 7

10 g of $SiO_2/Al_2O_3$ (with a specific surface area of 600 m$^2$/g, a pore volume of 1.1 ml/g, an aluminum content of 5 wt %, and a pore size of 17 nm) was impregnated in an ethanol solution of vanadiumoxy acetylacetonate (the loading amount of V relative to the total weight of the catalyst was 0.25 wt %), the immersion with continuous stirring was performed at 40° C. for about 4 h, then the temperature was raised to 100° C., and drying with the continuous stirring was performed for 8 h. The dried mixture was placed in a fluidized bed and calcined at a temperature starting from room temperature with a heating rate of 1° C./min. When the temperature reached 500° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 500° C.;

a dry air atmosphere was used when the temperature was reduced from 500° C. to 300° C. during natural cooling, and the atmosphere was switched to a nitrogen atmosphere when the temperature was lower than 300° C. The above calcined product was impregnated in an aqueous solution of chromium acetate hydroxide and sulfuric acid (the loading amounts of Cr and S relative to the total weight of the catalyst were 0.7 wt % and 2.7 wt %, respectively), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 8

10 g of $SiO_2/TiO_2$ (with a specific surface area of 500 $m^2$/g, a pore volume of 1.2 ml/g, a titanium content of 5 wt %, and a pore size of 25 nm) was impregnated in an aqueous solution of chromium nitrate (the loading amount of Cr relative to the total weight of the catalyst was 0.7 wt %), the immersion with continuous stirring was performed at 40° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 450° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 450° C.; a dry air atmosphere was used when the temperature was reduced from 450° C. to 300° C. during natural cooling, and the atmosphere was switched to a nitrogen atmosphere when the temperature was lower than 300° C. The above calcined product was impregnated in an aqueous solution of ammonium metavanadate and ammonium phosphate (the loading amounts of V and P relative to the total weight of the catalyst were 0.25 wt % and 4 wt %, respectively), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 9

10 g of $SiO_2/ZrO_2$ (with a specific surface area of 550 $m^2$/g, a pore volume of 1.4 ml/g, a zirconium content of 5 wt %, and a pore size of 13 nm) was impregnated in an aqueous solution of ammonium thiosulfate (the loading amount of S relative to the total weight of the catalyst was 2 wt %), the immersion with continuous stirring was performed at 40° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 450° C., the mixture was kept at a constant temperature for 4 h. After the calcination, the product was naturally cooled to room temperature and stored in a dry environment for use. In the above process, a nitrogen atmosphere was used at room temperature to 150° C.; a dry air atmosphere was used from 150° C. to 450° C.; a dry air atmosphere was used when the temperature was reduced from 450° C. to 300° C. during natural cooling, and the atmosphere was switched to a nitrogen atmosphere when the temperature was lower than 300° C. The above calcined product was impregnated in an aqueous solution of chromium nitrate (the loading amount of Cr relative to the total weight of the catalyst were 0.7 wt %), the immersion with continuous stirring was performed at 40° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 450° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 450° C.; a dry air atmosphere was used when the temperature was reduced from 450° C. to 300° C. during natural cooling, and the atmosphere was switched to a nitrogen atmosphere when the temperature was lower than 300° C. The above calcined product was impregnated in an aqueous solution of ammonium metavanadate (the loading amount of V relative to the total weight of the catalyst were 0.25 wt %), the immersion with continuous stirring was performed at 45° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 6 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in an n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 10

10 g of silica gel (with a specific surface area of 500 m$^2$/g, a pore volume of 1.3 ml/g, and a pore size of 20 nm) was impregnated in an aqueous solution of vanadium oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the product was naturally cooled to room temperature and transferred to anhydrous and oxygen-free conditions for storing. In the above process, a nitrogen atmosphere was used at room temperature to 150° C.; a dry air atmosphere was used from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst was transferred to n-hexane solution of triisobutylaluminum under protection by nitrogen. The molar ratio of Triisobutylaluminum to Cr in the catalyst was Al/Cr=7. The immersion with stirring was performed at 30° C. for 2 h, then heating and drying were performed, the drying was performed at 80° C. for 4 h; after the drying, the catalyst precursor pre-reduced by triisobutyl aluminum was transferred to anhydrous and oxygen-free condition for storage.

Example 11

10 g of silica gel (with a specific surface area of 500 m$^2$/g, a pore volume of 1.3 ml/g, and a pore size of 20 nm) was impregnated in an aqueous solution of vanadium oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the product was naturally cooled to room temperature and transferred to anhydrous and oxygen-free conditions for storing. In the above process, a nitrogen atmosphere was used at room temperature to 150° C.; a dry air atmosphere was used from 150° C. to 600° C.; a dry air atmosphere was used in a constant temperature stage of 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of bis-indenyl chromium (the loading amount of Cr was 1.0 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 12

10 g of silica gel (with a specific surface area of 500 m$^2$/g, a pore volume of 1.3 ml/g, and a pore size of 20 nm) was impregnated in an aqueous solution of vanadium oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the product was naturally cooled to room temperature and transferred to anhydrous and oxygen-free conditions for storing. In the above process, a nitrogen atmosphere was used at room temperature to 150° C.; a dry air atmosphere was used from 150° C. to 600° C.; a dry air atmosphere was used in a constant temperature stage of 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of difluorochromium (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Examples 13-1 to 13-6

10 g of silica gel (with a specific surface area of 500 m$^2$/g, a pore volume of 1.3 ml/g, and a pore size of 20 nm) was impregnated in an aqueous solution of vanadium oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the product was naturally cooled to room temperature and transferred to anhydrous and oxygen-free conditions for storing. In the above process, a nitrogen atmosphere was used at room temperature to 150° C.; a dry air atmosphere was used from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of chromocene at 45° C. for 6 h, the loading amount of Cr relative to the total weight of the catalyst was 0.2 wt %, 0.5 wt %, 1 wt %, 1.5 wt %, 2 wt % or 3 wt %, which are recorded as Example 13-1, 13-2, 13-3, 13-4, 13-5 and 13-6, respectively; then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions.

Example 14

100 mg of catalyst precursor in Example 1 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 15

100 mg of catalyst precursor in Example 2 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 16

Figure 2:
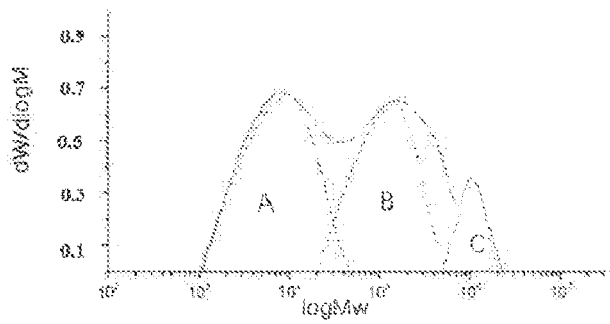
FIG. 2 is a high temperature GPC curve of a polyethylene product of a supported three-center catalyst prepared in Example 16.

100 mg of catalyst precursor in Example 3 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed. The high temperature GPC curve of the obtained polyolefin product is shown in FIG. 2

Example 17

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 18

100 mg of catalyst precursor in Example 5 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 19

100 mg of catalyst precursor in Example 6 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 20

100 mg of catalyst precursor in Example 7 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 21

100 mg of catalyst precursor in Example 8 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 22

100 mg of catalyst precursor in Example 9 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 23

100 mg of catalyst precursor in Example 10 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 1000 ml of refined n-heptane solvent was added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 24

100 mg of catalyst precursor in Example 11 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 25

100 mg of catalyst precursor in Example 12 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Examples 26-1 to 26-6

The catalyst precursor of Examples 13-1, 13-2, 13-3, 13-4, 13-5 or 13-6 was taken as the research object, and the precursor was recorded as Examples 26-1, 26-2, 26-3, 26-4, 26-5 or 26-6 respectively. 100 mg of catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 27

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=0, 5, 10, 15, 20 as a co-catalyst (corresponding to Examples 27-1, 27-2, 27-3, 27-4, 27-5 in turn) and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 28

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst, 10 ml, 30 ml, 50 ml and 100 ml of 1-hexene were added respectively (the percentage of comonomer 1-hexene in the total volume of added solvent was 1%, 3%, 5% and 10%, respectively, corresponding to Examples 28-1, 28-2, 28-3 and 28-4); then 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 29

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst, 30 ml of 1-hexene were added into the reactor; then 100 ml of n-heptane solvent refined by dehydration and deoxidation were sequentially added into the reactor. 0.3 bar, 0.5 bar, 1 bar and 1.5 bar hydrogen were respectively pressed into the reactor (corresponding to Examples 29-1, 29-2, 29-3 and 29-4 in turn). The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Example 30

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 1000 ml of refined n-heptane solvent was added into the reactor; 0.3 bar hydrogen was pressed into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 0.5 h, high-pressure nitrogen was used to press the triisobutyl aluminum (TIBA) with the amount of Al/Cr (Cr is the total chromium mole)=5 and 30 ml 1-hexene into the polymerization reactor, and the reaction continued for 0.5 h. At the same time, the instantaneous consumption of monomer ethylene was collected online by computer. The reaction was terminated by adding hydrochloric acid/ethanol mixed solution into the polymer slurry. After filtration, the obtained polymer was dried in a vacuum drying oven at 60° C. for 4 h, then weighed and analyzed.

Example 31

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 1000 ml of refined n-heptane solvent was added into the reactor; the ethylene pressure was adjusted to 3.5 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, the reaction was terminated by adding hydrochloric acid/ethanol mixed solution into the polymer slurry. After filtration, the obtained polymer was dried in a vacuum drying oven at 60° C. for 4 h, then weighed and analyzed.

Example 32

100 mg of catalyst precursor in Example 4 was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 1000 ml of refined n-heptane solvent was added into the reactor; the ethylene pressure was adjusted to 3.5 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 2 h, the reaction was terminated by adding hydrochloric acid/ethanol mixed solution into the polymer slurry. After filtration, the obtained polymer was dried in a vacuum drying oven at 60° C. for 4 h, then weighed and analyzed.

Comparative Example 1

10 g of silica gel (with a specific surface area of 500 m$^2$/g, a pore volume of 1.3 ml/g) was impregnated in an aqueous solution of vanadyl oxalate and chromium acetate hydroxide (the loading amounts of V and Cr relative to the total weight of the catalyst were 0.25 wt % and 0.7 wt %, respectively), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Comparative Example 2

10 g of silica gel (with a specific surface area of 500 $m^2$/g, a pore volume of 1.3 ml/g) was impregnated in an aqueous solution of chromium acetate hydroxide (the loading amount of Cr relative to the total weight of the catalyst was 0.7 wt %), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Comparative Example 3

10 g of silica gel (with a specific surface area of 500 $m^2$/g, a pore volume of 1.3 ml/g) was impregnated in an aqueous solution of vanadyl oxalate (the loading amount of V relative to the total weight of the catalyst was 0.25 wt %), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. The above calcined product was impregnated in a n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Comparative Example 4

10 g of silica gel (with a specific surface area of 500 $m^2$/g, a pore volume of 1.3 ml/g) was impregnated in an aqueous solution of chromium acetate hydroxide (the loading amount of Cr relative to the total weight of the catalyst was 0.7 wt %), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=5 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Comparative Example 5

10 g of silica gel (with a specific surface area of 500 m²/g, a pore volume of 1.3 ml/g) was impregnated in an aqueous solution of ammonium metavanadate (the loading amount of V relative to the total weight of the catalyst was 0.25 wt %), the immersion with continuous stirring was performed at 60° C. for about 4 h, then the temperature was raised to 120° C., and drying with the continuous stirring was performed for 8 h. The dried mixture was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. In the above process, a nitrogen atmosphere was used at room temperature to 150° C.; a dry air atmosphere was used in a heating stage from 150° C. to 600° C.; a dry air atmosphere was used when the temperature was reduced from 600° C. to 300° C. during natural cooling, and the atmosphere was switched to a nitrogen atmosphere when the temperature was lower than 300° C. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=5 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

Comparative Example 6

10 g of silica gel (with a specific surface area of 500 m²/g, a pore volume of 1.3 ml/g) was placed in a fluidized bed and calcined at a temperature starting from room temperature with a heating rate of 1° C./min. When the temperature reached 600° C., the mixture was kept at a constant temperature for 4 h. After the calcination, the mixture was naturally cooled to room temperature and transferred to anhydrous and oxygen-free conditions for storing. The whole process mentioned above was carried out in nitrogen atmosphere. The above calcined product was impregnated in a n-hexane solution of chromocene (the loading amount of Cr was 1.5 wt % relative to the total weight of the catalyst) at 45° C. for 6 h, then heating and drying were performed, the drying was performed at 80° C. for 4 h, and stirring was performed during the impregnation and drying; after the drying, the catalyst precursor was transferred under protection by nitrogen and stored under anhydrous and oxygen-free conditions. 100 mg of the above catalyst precursor was weighed and mixed with 10 ml of refined n-heptane solution to form a catalyst precursor suspension for polymerization experiments. A 2 L stainless steel high-pressure polymerization reactor was heated under vacuum to remove impurities, and was pumped with high-purity nitrogen three times, and finally the reactor was filled with a trace amount of refined ethylene to 0.12 MPa. Then 900 ml of refined n-heptane solvent, triisobutyl aluminum (TIBA) with a use amount being Al/Cr (Cr is the total moles of chromium)=10 as a co-catalyst and 100 ml of n-heptane solvent refined by dehydration and deoxidation were sequentially added into the reactor. The ethylene pressure was adjusted to 1 MPa, and after the temperature in the reactor was constant at 80° C., high-pressure nitrogen was used to press the catalyst precursor suspension into the polymerization reactor to start the reaction. Instantaneous consumption of monomer ethylene was collected online and recorded by a computer during the reaction process. After 1 h, a hydrochloric acid/ethanol mixed solution was added to terminate the reaction. After filtration, the obtained polymer was dried in a vacuum drying oven at 60° C. for 4 h, then weighed and analyzed.

TABLE 1

Results of ethylene polymerization of the supported three-center catalyst prepared by using different preparation methods

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 14 | 9874 | 3.7 | 34 | 0 |
| Example 15 | 10830 | 3.5 | 42 | 0 |
| Example 16 | 11217 | 3.7 | 38 | 0 |
| Example 17 | 14120 | 4.5 | 33 | 0 |
| Example 18 | 15606 | 3.2 | 54 | 0 |
| Example 19 | 14266 | 3.1 | 61 | 0 |
| Example 20 | 14582 | 3.2 | 47 | 0 |
| Example 21 | 14513 | 2.8 | 38 | 0 |
| Example 22 | 13981 | 3.2 | 45 | 0 |
| Example 23 | 12836 | 3.5 | 34 | 0 |
| Example 24 | 8887 | 4.1 | 31 | 0 |
| Example 25 | 8610 | 4.5 | 27 | 0 |

The main difference between Example 14 and Examples 15-16 is that the chromium and vanadium of the former were co-impregnated, while the chromium and vanadium of the latter two were impregnated stepwise. It can be found that the catalyst prepared by using the stepwise impregnation method has slightly higher ethylene polymerization activity than that prepared by using the co-impregnation method, but the molecular weight of the polymer and the molecular weight distribution are equivalent. Through comparison between Examples 15 and 16 or between Examples 18 and 20, respectively, it can be found that the loading sequence of each component of the catalyst has little impact on its ethylene polymerization performance. The main difference between Examples 14-16 and Examples 17-23 is that the latter introduces a catalyst modification component during the catalyst preparation process. It can be found that the activity of the catalysts, in which the modification components are added under the same polymerization conditions, is generally improved, the overall molecular weight of the polymer has been reduced, and the molecular weight distribution has been broadened.

TABLE 2

Results of ethylene polymerization of catalysts prepared in different proportions

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 26-1 | 7406 | 7.7 | 25 | 0 |
| Example 26-2 | 7899 | 6.5 | 29 | 0 |
| Example 26-3 | 8985 | 4.8 | 31 | 0 |
| Example 26-4 | 9874 | 3.7 | 34 | 0 |
| Example 26-5 | 11849 | 2.9 | 37 | 0 |
| Example 26-6 | 13824 | 2.1 | 43 | 0 |
| Example 26-1 | 7406 | 7.7 | 25 | 0 |
| Example 26-2 | 7899 | 6.5 | 29 | 0 |
| Example 26-3 | 8985 | 4.8 | 31 | 0 |
| Example 26-4 | 9874 | 3.7 | 34 | 0 |
| Example 26-5 | 11849 | 2.9 | 37 | 0 |
| Example 26-6 | 13824 | 2.1 | 43 | 0 |

The main difference between Examples 26-1 to 26-6 lies in the amount of the organic chromocene component added in the catalysts used, which accounted for 0.2 wt %, 0.5 wt %, 1 wt %, 1.5 wt %, 2 wt % and 3 wt % of the total mass of the catalyst based on the mass of Cr, respectively. From Table 2, it can be seen that as the amount of chromocene added increases, the polymerization activity of the catalyst gradually increases, while the molecular weight of the polymer gradually decreases, and the molecular weight distribution increases. This is mainly because the active center formed after the chromocene component is loaded tends to polymerize ethylene to form polyethylene with a lower molecular weight.

TABLE 3

Results of ethylene polymerization of catalysts under different co-catalyst concentrations

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 27-1 | 7342 | 2.7 | 21 | 0 |
| Example 27-2 | 12002 | 3.9 | 30 | 0 |
| Example 27-3 | 14120 | 4.5 | 37 | 0 |
| Example 27-4 | 13131 | 4.9 | 40 | 0 |
| Example 27-5 | 12425 | 5.1 | 42 | 0 |
| Example 31 | 5134 | 2.5 | 56 | 0 |
| Example 32 | 9094 | 3.9 | 27 | 0 |

Figure 3:
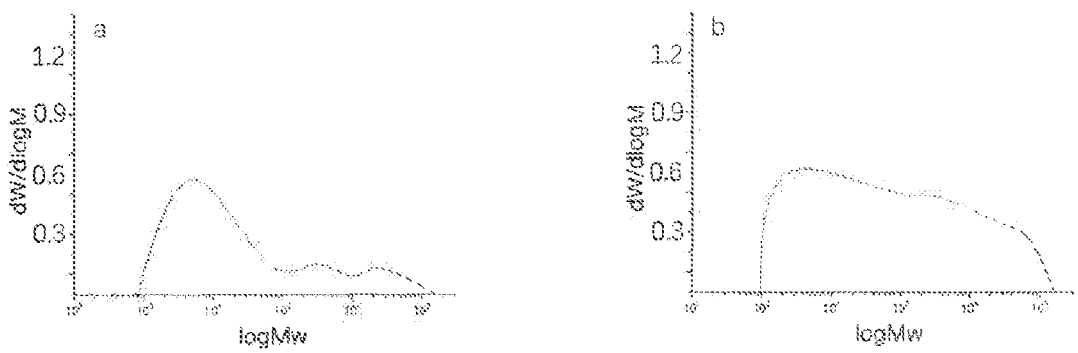
FIG. 3 is a GPC-FTIR characterization curve of polymers obtained in Example Examples 31 and 32 of the present invention.

The main difference between Examples 27-1 to 27-5 is that the co-catalyst triisobutylaluminum was added in different amounts during the polymerization process, and the added amount was 0, 5, 10, 15, and 20, respectively, according to the molar ratio Al/Cr of the co-catalyst to the metal center. It can be seen from Table 3 that when the co-catalyst is added, the activity of the catalytic system is significantly improved, but when the value of Al/Cr is greater than a certain value, the catalytic activity begins to decrease, that is, a supported three-center catalyst with a specific composition has the optimum Al/Cr ratio that makes its polymerization activity the highest. In addition, it can be seen that with the increase of the Al/Cr value, the molecular weight of the polymer gradually increases, and the molecular weight distribution of the polymer also increases accordingly. Examples 31 and 32 show polymerization results under the condition that no organometallic co-catalyst was added. The polymerization time of the former was 1 h, and the polymerization time of the latter was 2 h. Obviously, when the co-catalyst is not added, the three-center catalyst of the present invention still has certain ethylene polymerization activity, but the activity is significantly reduced compared with the case where the co-catalyst has been added. This shows that a certain amount of co-catalyst co-catalysts promotes the activity of catalyst centers, especially inorganic chromium and inorganic vanadium active centers (see FIG. 3, wherein a represents Example 31 and b represents Example 32).

TABLE 4

Results of ethylene polymerization of catalysts under different 1-hexene addition amounts

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 28-1 | 15532 | 4.1 | 37 | 0.45 |
| Example 28-2 | 12990 | 3.8 | 41 | 0.77 |
| Example 28-3 | 12284 | 3.7 | 43 | 0.98 |
| Example 28-4 | 11578 | 3.6 | 40 | 1.16 |

The main difference of Examples 28-1 to 28-4 is that the amount of comonomer 1-hexene added during the polymerization process was different, and the addition amount was 1%, 3%, 5%, and 10% respectively based on the volume fraction of 1-hexene in the solvent. It can be seen from Table 4 above that with the addition of 1-hexene, the activity of the catalyst shows a tendency to increase first and then decrease. This has been reported in most olefin polymerization catalyst systems, and is the so-called comonomer effect. In addition, with the addition of 1-hexene, the molecular weight of the polymer is reduced, and the molecular weight distribution is broadened. This is due to the fact that 1-hexene can promote the chain transfer reaction of the catalyst to a certain extent. In addition, it is known from the content of 1-butene short-chain branch in the polymer that when added, 1-hexene can be effectively inserted into the polyethylene chain. In addition, through GPC-FTIR characterization results (see FIG. 4), it can be seen that the short-chain branches of the polymer are inversely distributed, i.e., the short-chain branches are mainly distributed in a high molecular weight part. This is because the active component V in the catalyst has significantly better copolymerization performance than the other two active components.

TABLE 5

Results of ethylene polymerization of catalysts under different hydrogen partial pressures

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 29-1 | 13414 | 3.5 | 27 | 0 |
| Example 29-2 | 12708 | 2.9 | 21 | 0 |
| Example 29-3 | 11719 | 2.4 | 18 | 0 |
| Example 29-4 | 11013 | 1.8 | 16 | 0 |

The main difference between Examples 29-1 to 29-4 is that the partial pressures of hydrogen added during the polymerization process were different, which were 0.3 bar, 0.5 bar, 1 bar and 1.5 bar hydrogen in order. From Table 5, it can be seen that the polymerization activity of the catalyst successively decreases after hydrogen is added during the polymerization process, but the molecular weight of the polymer is significantly reduced, indicating that the catalyst has excellent hydrogen modulation sensitivity. In addition, as the hydrogen partial pressure increases, the molecular weight distribution of the polymer becomes narrower.

TABLE 6

Results of two-stage ethylene polymerization of the supported three-center catalyst

| Example | polymerization activity (g polymer/ g catalyst) | Weight average molecular weight × $10^{-5}$ | molecular weight distribution | 1-Butyl short-chain branch content (mol %) |
|---|---|---|---|---|
| Example 30 | 9884 | 3.1 | 51 | 0.65 |

Figure 4:
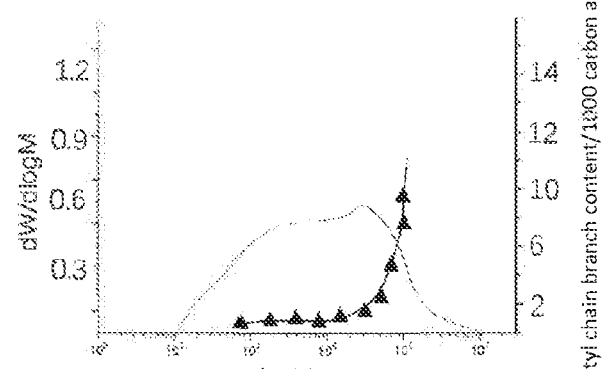
FIG. 4 is a GPC-FTIR characterization curve of a polymer obtained in Example 28-2 of the present invention.
Figure 5:
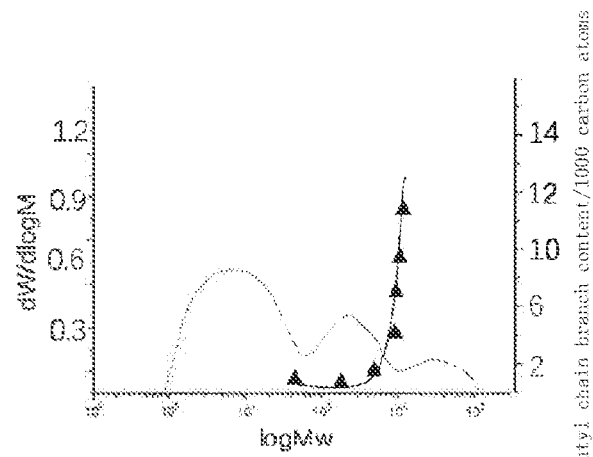
FIG. 5 is a GPC-FTIR characterization curve of a polymer obtained in Example 30 of the present invention.

In Example 30, a two-stage polymerization form was used to simulate an industrially commonly used series polymerization process for ethylene polymerization. In the first stage of polymerization, no co-catalyst or comonomer is added, so the organic chromium active component (the catalyst component has ethylene polymerization activity without requiring activation by the co-catalyst) polymerizes ethylene to obtain an ethylene homopolymer with a lower molecular weight. After the co-catalyst and the comonomer are added in the second stage of polymerization, precursors of the inorganic chromium and inorganic vanadium active components are massively activated by the co-catalyst to perform the copolymerization of ethylene-1-hexene, to form a large number of copolymers with a higher molecular weight. In addition, the organic chromium active component mainly continues homopolymerization of ethylene because of its poor copolymerization performance. Therefore, the series polymerization process can flexibly control the molecular weight of the polymer and the distribution of comonomers. For example, the amounts of comonomers added in Example 30 and Example 28-2 are the same. Although the comonomer insertion amount of the latter is higher, the polymer comonomers of the former are more concentrated in the higher molecular weight components (as shown in FIG. 4 and FIG. 5), which is more conducive to improving the long-term mechanical properties of the polymer.

TABLE 7

Results of ethylene polymerization of supported three-center, two-center and single-center catalysts

| Example | polymerization activity (g polymer/ g catalyst) | Weight average molecular weight × $10^{-5}$ | molecular weight distribution | 1-Butyl short-chain branch content (mol %) |
|---|---|---|---|---|
| Comparative Example 1 | 7406 | 8.5 | 21 | 0 |
| Comparative Example 2 | 8393 | 2.6 | 35 | 0 |
| Comparative Example 3 | 5233 | 4.9 | 107 | 0 |
| Comparative Example 4 | 3160 | 4 | 18 | 0 |
| Comparative Example 5 | 987 | 24 | 4 | 0 |
| Comparative Example 6 | 2469 | 1 | 3 | 0 |

Figure 6:
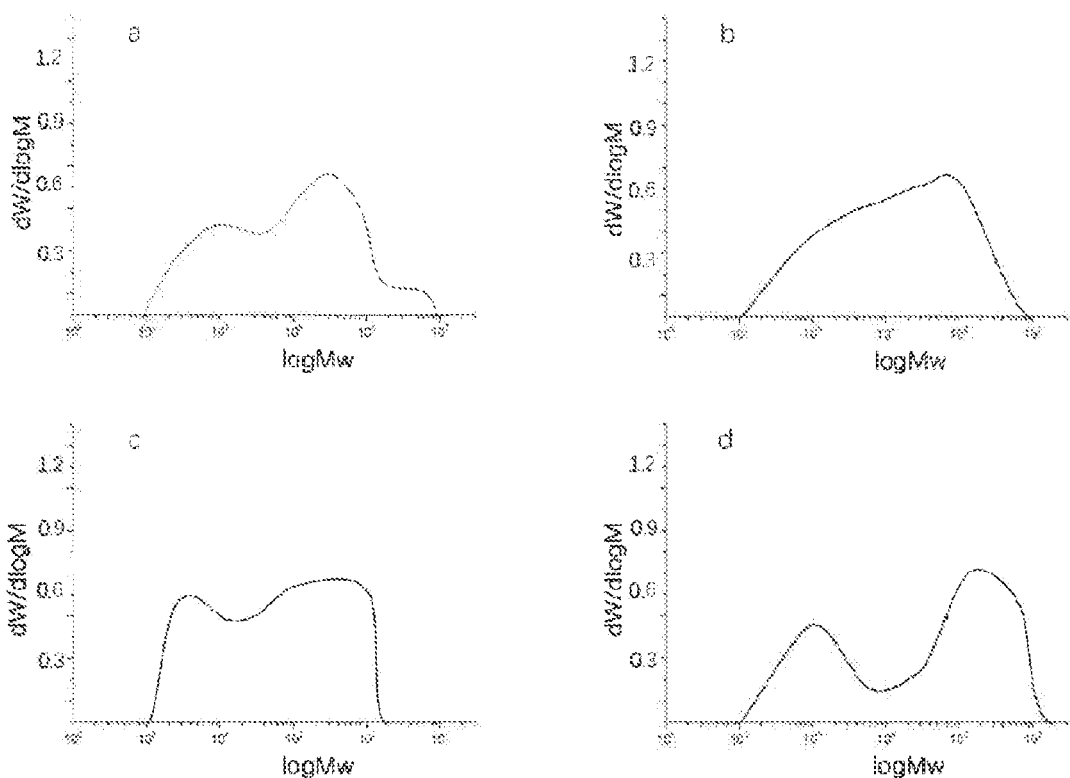
FIG. 6 is a high temperature GPC curve of polymers obtained in Example 14, Comparative Example 1, Comparative Example 2, and Comparative Example 3 of the present invention.

By comparing Example 14 with Comparative Example 1-3, it can be seen that under the same polymerization conditions, compared with the supported two-center catalyst, the supported three-center catalyst has significantly higher ethylene polymerization activity, and the molecular weight and molecular weight distribution of the polymers are obviously different, and can be observed by the high temperature GPC curve (see FIG. 6, where a, b, c, d are sequentially high temperature GPC curves of polymers obtained in Example 14, Comparative Example 1, Comparative Example 2 and Comparative Example 3), i.e., when only the two precursors of catalyst active components in the three-center catalyst of the present invention are supported, the molecular weight of the polyethylene product of the two-center catalyst obtained after activation by the organometallic co-catalyst can only show a unimodal or bimodal distribution. However, the polymer molecular weight of the supported three-center catalyst of the present invention can present a trimodal distribution, which is mainly because the ethylene insertion and chain transfer reaction energy barriers of the three active centers are quite different, and the molecular weights of the polyethylene products are quite different. However, compared with the two-center catalyst, the three-center catalyst has a larger operating space in adjusting the molecular weight distribution of the polymer. By simultaneously comparing Comparative Examples 1-6 and Example 14, it can be seen that the ethylene polymerization activity of the supported three-center catalyst of the present invention is significantly higher than that of the single-center catalyst and that of the two-center catalyst, and is about 50% higher than the sum of the ethylene polymerization activities of the three single-center catalysts, fully showing the catalytic synergistic effect between the active centers in the supported three-center catalyst.

The above examples are preferable embodiments of the present invention. However, the embodiments of the present invention are not limited to the above examples. Any other change, modification, substitute, combination and simplification, which do not depart from the spiritual substance and principle of the present invention, are all equivalent replacement and shall be comprised in the scope of protection of the present invention.

The invention claimed is:

1. A supported three-center catalyst, wherein:
the three-centered catalyst comprises a porous inorganic carrier, an organic chromium active component, an inorganic chromium active component, an inorganic vanadium active component, and optionally, a catalyst modification component;
the organic chromium active component is obtained after a precursor of the organic chromium active component is activated by an organometallic co-catalyst or a polymerization monomer, and the precursor of the organic chromium active component is obtained by loading an organic chromium source comprising at least one of a cyclopentadienyl ligand, an indenyl ligand, a fluorenyl ligand, a cyclopentadienyl derivative ligand, an indenyl derivative ligand, or a fluorenyl derivative ligand onto the surface of the porous inorganic carrier;
the inorganic chromium active component is obtained by activating a precursor of the inorganic chromium active component by an organometallic co-catalyst or a polymerization monomer, and the precursor of the inorganic chromium active component is a high-temperature calcined product of a chromium source on the surface of the porous inorganic carrier;
the inorganic vanadium active component is obtained after a precursor of the inorganic vanadium active component is activated by an organometallic co-catalyst or a polymerization monomer, and the precursor of the inorganic vanadium active component is a high-temperature calcined product of a vanadium source on the surface of the porous inorganic carrier;
the catalyst modification component is a high-temperature calcined product of a compound comprising sulfur, phosphorus or halogen element on the surface of the porous inorganic carrier, wherein the compound comprising sulfur, phosphorus or halogen element is referred to as a component Q;
the organometallic co-catalyst comprises at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen; and
the polymerization monomer is ethylene or α-olefins.

2. The supported three-center catalyst according to claim 1, wherein:
the organic chromium source has a structure according to the following formula $CrCp^*_1Cp^*_2$, wherein $Cp^*_1$ and $Cp^*_2$ are both cyclopentadienyl or derivatives thereof, indenyl or derivatives thereof, or fluorenyl or derivatives thereof, and whether $Cp^*_1$ and $Cp^*_2$ have the same structure is not limited; wherein the structure of $Cp^*_1$ and $Cp^*_2$ is one of the following structures:

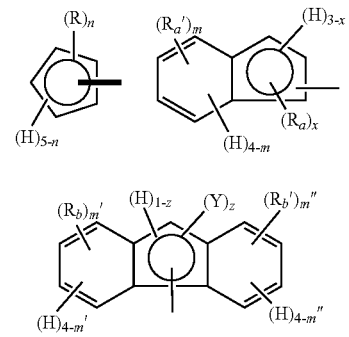

wherein:
each R is independently an aliphatic, alicyclic, or aromatic hydrocarbyl group with 1 to 20 carbon atoms, and n is an integer from 0 to 5;
each Ra and each Ra' is independently an aliphatic, alicyclic, or aromatic hydrocarbyl group with 1 to 10 carbon atoms, m is an integer from 0 to 4; and x is an integer from 0 to 3;
each Rb and each Rb' is independently an aliphatic, alicyclic, or aromatic hydrocarbyl group with 1 to 10 carbon atoms, m' and m" are each an integer from 0 to 4, Y is H, Rb, or Rb', and z is 0 or 1;
the chromium source is selected from at least one of chromium trioxide, chromium nitrate, chromium acetate, chromium chloride, chromium sulfate, ammonium chromate, ammonium dichromate, or chromium acetate hydroxide;
the vanadium source is selected from at least one of ammonium hexafluorovanadate, vanadium nitrate, vanadyl oxalate, ammonium metavanadate, vanadyl sulfate, vanadium (IV) oxide sulfate hydrate, vanadium (III) sulfate, vanadium oxytrichloride, sodium orthovanadate, sodium metavanadate, a non-water-soluble vanadium-containing salt, vanadium triisopropoxy oxide, vanadium (V) oxytripropoxide, vanadium acetylacetonate, vanadium oxytriethoxide, vanadyl chloride, or vanadium silicide;
the component Q is selected from: sulfuric acid, persulfuric acid, pyrosulfuric acid, sulfurous acid, taurine, ammonium sulfate, ammonium sulfite, ammonium persulfate, titanium sulfate, zirconium sulfate, vanadium sulfate, iron sulfate, ferrous sulfate, ammonium ferrous sulfate, nickel sulfate, zinc sulfate, aluminum sulfate, tin sulfate, antimony sulfate, phosphoric acid, pyrophosphoric acid, superphosphoric acid, phosphorous acid, metaphosphoric acid, ammonium phosphate, ammonium pyrophosphate, ammonium superphosphate, ammonium phosphite, ammonium hypophosphite, ammonium metaphosphate, titanium phosphate, zirconium phosphate, iron phosphate, nickel phosphate, zinc phosphate, aluminum phosphate, tin phosphate, antimony phosphate, hydrofluoric acid, ammonium fluoride, fluorosilicic acid, fluoroboric acid, ammonium fluoroborate, ammonium bifluoride, ammonium hexafluorosilicate, boron trifluoride, aluminum fluoride, antimony fluoride, ammonium hexafluorophosphate, ammonium hexafluorotitanate, hydrochloric acid, chlorosulfonic acid, ammonium chloride, ferrous chloride, ferric chloride, aluminum chloride, titanium tetrachloride, hydrobromic acid, ammonium bromide, iron bromide, ferrous bromide or aluminum bromide, or any combination thereof; and the porous inorganic carrier is at least one of silicon oxide, aluminum oxide, aluminosilicate, inorganic clay, titanium oxide, zirconium oxide, magnesium oxide, calcium oxide, iron oxide, tin oxide, zinc oxide, boron oxide, tungsten oxide, or niobium oxide; and the porous inorganic carrier has a specific surface area of 50-800 m²/g, a pore volume of 0.1-5.0 cm³/g, and an average pore size of 1-50 nm.

3. The supported three-center catalyst according to claim 1, wherein:

in the supported three-center catalyst, a content of Cr in the precursor of the organic chromium active component is 0.1-12 wt % based on a total weight of the supported three-center catalyst; a content of Cr in the precursor of the inorganic chromium active component is 0.05-12 wt % based on the total weight of the supported three-center catalyst; a content of V in the precursor of the inorganic vanadium active component is 0.05-10 wt % based on the total weight of the supported three-center catalyst; and a content of sulfur, phosphorus and halogen elements in the catalyst modification component is 0.1-20 wt % based on the total weight of the supported three-center catalyst.

4. The supported three-center catalyst according to claim 1, wherein an active center precursor structure of the supported three-center catalyst is as follows:

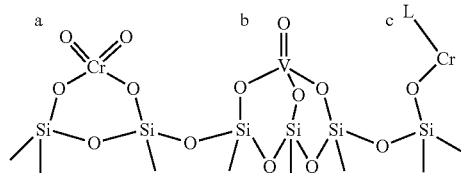

wherein structure a is the precursor of the inorganic chromium active component, structure b is the precursor of the inorganic vanadium active component, structure c is the precursor of the organic chromium active component, and L in structure c is one of cyclopentadienyl or a derivative thereof, indenyl or a derivative thereof, or fluorenyl or a derivative thereof.

5. A method for preparing the supported three-center catalyst according to claim 1, wherein:

the preparation steps of the supported three-center catalyst comprise preparation of a precursor of the supported three-center catalyst and activation of the precursor of the supported three-center catalyst;

when the supported three-center catalyst comprises the porous inorganic carrier, the organic chromium active component, the inorganic chromium active component, the inorganic vanadium active component, and the catalyst modification component, the preparation of the precursor of the supported three-center catalyst comprises the following steps:

(1.1) via procedures of impregnation, drying and high-temperature calcination, converting, the chromium source, the vanadium source, and the component Q into the precursor of the inorganic chromium active component, the precursor of the inorganic vanadium active component, and the catalyst modification component that are supported on the surface of the porous inorganic carrier, respectively, to obtain a precursor of a supported two-center catalyst, wherein the precursor of the inorganic chromium active component, the precursor of the inorganic vanadium active component, and the catalyst modification component are supported in an arbitrary order;

(1.2) via procedures of impregnation and drying, converting the organic chromium source into the precursor of the organic chromium active component supported on a surface of the precursor of the supported two-center catalyst in step (1.1), to obtain the precursor of the supported three-center catalyst;

when the supported three-center catalyst comprises the porous inorganic carrier, the organic chromium active component, the inorganic chromium active component, and the inorganic vanadium active component, the preparation of the precursor of the supported three-center catalyst comprises the following steps:

(2.1) via procedures of impregnation, drying and high-temperature calcination, converting the chromium source and the vanadium source into the precursor of the inorganic chromium active component and the precursor of the inorganic vanadium active component that are supported on the surface of the porous inorganic carrier, respectively, to obtain a precursor of a supported two-center catalyst, wherein the precursor of the inorganic chromium active component and the precursor of the inorganic vanadium active component are supported in an arbitrary order;

(2.2) via procedures of impregnation and drying, converting the chromium source of the organic chromium catalyst into the precursor of the organic chromium active component supported on a surface of the precursor of the supported two-center catalyst in step (2.1), to obtain the precursor of the supported three-center catalyst; and the activation of the precursor of the supported three-center catalyst comprises the following steps: adding the organometallic co-catalyst to the precursor of the supported three-center catalyst for pre-treatment and activation, and then drying to obtain the three-center supported catalyst; or placing the precursor of the three-center supported catalyst into a reactor before polymerization to react with the organometallic co-catalyst to form the three-center supported catalyst in situ; or placing the precursor of the three-center supported catalyst in high-pressure polymerization monomers, and forming the three-center supported catalyst through in-situ activation by the polymerization monomers.

6. The method according to claim 5 for preparing the supported three-center catalyst, wherein:

in step (1.1) and step (2.1), the chromium source, the vanadium source, and the component Q enter porous inorganic carrier pores through impregnation and stirring by using an inert solvent as a medium, and are adsorbed on a surface of the pores, wherein the inert solvent is at least one of water, methanol, ethanol, n-hexane, n-heptane, n-octane, benzene, toluene, or xylene, wherein:

a content of Cr in the inorganic chromium active component is 0.05-12 wt % based on a total weight of the supported three-center catalyst;

a content of V in the inorganic vanadium active component is 0.05-10 wt % based on the total weight of the supported three-center catalyst;

a content of sulfur, phosphorus and halogen elements in the catalyst modification component is 0.1-20 wt % based on the total weight of the supported three-center catalyst;

impregnation is performed at a temperature of 20-120° C., and impregnation is performed for 1-24 h;

the drying is performed at 60-150° C., and the drying is performed for 2-24 h;

high-temperature calcination is performed at a temperature of 300-900° C., a heating rate of the high-temperature calcination process is 0.1-5° C./min, and high-temperature calcination is performed for 2-24 h;

in step (1.2) and step (2.2), the organic chromium source is provided in an inert organic solvent as a medium, and reacts with remaining hydroxyl groups on the surface of the porous inorganic carrier by using an impregnation and stirring method so as to be loaded onto the surface of the carrier, wherein:

a content of Cr in the organic chromium active component is 0.1-12 wt % based on the total weight of the three-center supported catalyst;

the inert organic solvent is selected from organic hydrocarbon compounds;

impregnation is performed at a temperature of 20-120° C., and impregnation is performed for 1-24 h; and drying is performed at a temperature of 60-150° C., and drying is performed for 2-24 h.

7. The method according to claim 5 for preparing the supported three-center catalyst, wherein:

in the activation step of the precursor of the supported three-center catalyst, the organometallic co-catalyst performs reduction and activation treatment of the precursor of the supported three-center catalyst under an inert atmosphere; a molar ratio of the organometallic co-catalyst to the chromium in the precursor of the supported three-center catalyst is 0-1000; the reduction and activation treatment are performed at room temperature to 100° C., and the reduction and activation treatment are performed for 0.5-20 h; after the activation treatment, drying is performed at 60-120° C. for 2-8 h; drying is performed under a nitrogen or inert gas atmosphere or under vacuum conditions;

in the activation step of the supported three-center catalyst precursor, in-situ formation of the supported three-center catalyst by the reaction of the precursor of the supported three-center catalyst and the organometallic co-catalyst refers to in-situ reduction and activation treatment in a solvent medium selected from isopentane, n-pentane, n-hexane, isohexane, n-heptane, n-octane, toluene, or xylene; a molar ratio of a metal element in the organometallic co-catalyst to the chromium element in the precursor of the supported three-center catalyst is 0-1000; and the in-situ reduction and activation treatment is performed at 20-120° C. for 0.5-5 h; or in the activation step of the supported three-center catalyst precursor, in-situ activation by polymerization monomers refers to in-situ reduction and activation treatment performed in a solvent medium selected from at least one of isopentane, n-pentane, n-hexane, isohexane, n-heptane, n-octane, toluene, or xylene; a partial pressure of the polymerization monomer is 1-5 MPa; and in-situ reduction and activation treatment are performed at 50-120° C.

8. The supported three-center catalyst according to claim 2, wherein:

the inorganic clay is montmorillonite; and the silicon oxide is amorphous porous silica gel.

9. The method according to claim 7 for preparing the supported three-center catalyst, wherein the solvent medium is at least one of isopentane, n-hexane, isohexane, or n-heptane.

10. A method for homopolymerization of ethylene or copolymerization of ethylene and α-olefin catalyzed by the supported three-center catalyst according to claim 1, wherein a slurry polymerization process is used for polymerization, and wherein the method comprises: adding ethylene or ethylene and α-olefins to a reactor, adding a solvent and a co-catalyst, optionally adding hydrogen and comonomers, and adding the supported three-center catalyst.

11. A method for homopolymerization of ethylene or copolymerization of ethylene and α-olefin catalyzed by the supported three-center catalyst according to claim 2, wherein a slurry polymerization process is used for polymerization, and wherein the method comprises: adding ethylene or ethylene and α-olefins to a reactor, adding a solvent and a co-catalyst, optionally adding hydrogen and comonomers, and adding the supported three-center catalyst.

12. A method for homopolymerization of ethylene or copolymerization of ethylene and α-olefin catalyzed by the supported three-center catalyst according to claim 3, wherein a slurry polymerization process is used for polymerization, and wherein the method comprises: adding ethylene or ethylene and α-olefins to a reactor, adding a solvent and a co-catalyst, optionally adding hydrogen and comonomers, and adding the supported three-center catalyst.

13. A method for homopolymerization of ethylene or copolymerization of ethylene and α-olefin catalyzed by the supported three-center catalyst according to claim 4, wherein a slurry polymerization process is used for polymerization, and wherein the method comprises: adding ethylene or ethylene and α-olefins to a reactor, adding a solvent and a co-catalyst, optionally adding hydrogen and comonomers, and adding the supported three-center catalyst.

14. A method for homopolymerization of ethylene or copolymerization of ethylene and α-olefin catalyzed by the supported three-center catalyst according to claim 8, wherein a slurry polymerization process is used for polymerization, and wherein the method comprises: adding ethylene or ethylene and α-olefins to a reactor, adding a solvent and a co-catalyst, optionally adding hydrogen and comonomers, and adding the supported three-center catalyst.

15. The method according to claim 10, wherein:

at least one of a molecular weight regulator or an organometallic co-catalyst is added during the slurry polymerization process;

the molecular weight regulator is hydrogen; and the organometallic co-catalyst is at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen.

16. The method according to claim 11, wherein:

at least one of a molecular weight regulator or an organometallic co-catalyst is added during the slurry polymerization process;

the molecular weight regulator is hydrogen; and the organometallic co-catalyst is at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen.

17. The method according to claim 12, wherein:

at least one of a molecular weight regulator or an organometallic co-catalyst is added during the slurry polymerization process;

the molecular weight regulator is hydrogen; and the organometallic co-catalyst is at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen.

18. The method according to claim 13, wherein:

at least one of a molecular weight regulator or an organometallic co-catalyst is added during the slurry polymerization process;

the molecular weight regulator is hydrogen; and the organometallic co-catalyst is at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen.

19. The method according to claim 14, wherein:

at least one of a molecular weight regulator or an organometallic co-catalyst is added during the slurry polymerization process;

the molecular weight regulator is hydrogen; and the organometallic co-catalyst is at least one of an organoaluminum compound, an organolithium compound, or an organoboron compound, wherein the organoaluminum compound is at least one of trialkyl aluminum $AlR_3$, dialkyl aluminum alkoxide $AlR_2OR$, dialkyl aluminum halide $AlR_2X$, aluminoxane, or ethyl sesquialuminum chloride, wherein R is an alkyl group, and wherein X is halogen.

\* \* \* \* \*